United States Patent
Oda et al.

(10) Patent No.: US 9,773,593 B2
(45) Date of Patent: *Sep. 26, 2017

(54) METHOD FOR PRODUCING SINTERED FERRIT MAGNET, AND SINTERED FERRITE MAGNET

(71) Applicant: HITACHI METALS, LTD., Minatu-ku, Tokyo (JP)

(72) Inventors: Etsushi Oda, Mishima-gun (JP); Yoshinori Kobayashi, Mishima-gun (JP)

(73) Assignee: HITACHI METALS, LTD., Tokyo (JP)

(*) Notice: Subject to any disclaimer, the term of this patent is extended or adjusted under 35 U.S.C. 154(b) by 165 days.

This patent is subject to a terminal disclaimer.

(21) Appl. No.: 14/807,953

(22) Filed: Jul. 24, 2015

(65) Prior Publication Data

US 2015/0332819 A1 Nov. 19, 2015

Related U.S. Application Data

(63) Continuation of application No. 13/381,526, filed as application No. PCT/JP2010/060280 on Jun. 17, 2010, now Pat. No. 9,162,928.

(30) Foreign Application Priority Data

Jun. 30, 2009 (JP) .................. 2009-156297

(51) Int. Cl.
C04B 35/26 (2006.01)
H01F 1/055 (2006.01)
(Continued)

(52) U.S. Cl.
CPC ....... *H01F 1/0557* (2013.01); *C01G 49/0054* (2013.01); *C01G 51/68* (2013.01);
(Continued)

(58) Field of Classification Search
CPC .......... H01F 1/0557; H01F 1/11; H01F 1/348; H01F 7/02; H01F 41/0266;
(Continued)

(56) References Cited

U.S. PATENT DOCUMENTS 7,758,767 B2 7/2010 Kobayashi et al.
8,206,606 B2 6/2012 Hosokawa et al.
(Continued)

FOREIGN PATENT DOCUMENTS

EP 2006864 A1 12/2008
EP 2043112 A1 4/2009
(Continued)

OTHER PUBLICATIONS

Japanese Office Action issued in corresponding JP Application No. 2011-520863, dated Nov. 12, 2013.
(Continued)

*Primary Examiner* — Carol M Koslow
(74) *Attorney, Agent, or Firm* — Sughrue Mion, PLLC

(57) ABSTRACT

A sintered ferrite magnet comprising (a) a ferrite phase having a hexagonal M-type magnetoplumbite structure comprising Ca, an element R which is at least one of rare earth elements and indispensably includes La, an element A which is Ba and/or Sr, Fe, and Co as indispensable elements, the composition of metal elements of Ca, R, A, Fe and Co being represented by the general formula of $Ca_{1-x-y}R_xA_yFe_{2n-z}Co_z$, wherein the atomic ratios (1-x-y), x, y and z of these elements and the molar ratio n meet the relations of $0.3 \leq (1-x-y) \leq 0.65$, $0.2 \leq x \leq 0.65$, $0 \leq y \leq 0.2$, $0.03 \leq z \leq 0.65$, and $4 \leq n \leq 7$, and (b) a grain boundary phase indispensably containing Si, the amount of Si being more than 1% by mass and 1.8% or less by mass (calculated as $SiO_2$) based on the entire sintered ferrite magnet, and its production method.

7 Claims, 10 Drawing Sheets

(51) Int. Cl.
*H01F 7/02* (2006.01)
*H01F 1/11* (2006.01)
*H01F 1/34* (2006.01)
*H01F 41/02* (2006.01)
*C01G 49/00* (2006.01)
*C01G 51/00* (2006.01)

(52) U.S. Cl.
CPC ...... *C04B 35/2633* (2013.01); *C04B 35/2641* (2013.01); *H01F 1/11* (2013.01); *H01F 1/348* (2013.01); *H01F 7/02* (2013.01); *H01F 41/0266* (2013.01); *C01P 2002/76* (2013.01); *C01P 2006/42* (2013.01); *C04B 2235/3208* (2013.01); *C04B 2235/3213* (2013.01); *C04B 2235/3215* (2013.01); *C04B 2235/3224* (2013.01); *C04B 2235/3227* (2013.01); *C04B 2235/3229* (2013.01); *C04B 2235/3275* (2013.01); *C04B 2235/3277* (2013.01); *C04B 2235/3409* (2013.01); *C04B 2235/3418* (2013.01); *C04B 2235/44* (2013.01); *C04B 2235/442* (2013.01); *C04B 2235/767* (2013.01); *C04B 2235/85* (2013.01)

(58) Field of Classification Search
CPC ............ C04B 35/2633; C04B 35/2641; C01G 49/0054; C01G 51/68
See application file for complete search history.

(56) References Cited

U.S. PATENT DOCUMENTS

| | | | |
|---|---|---|---|
| 8,303,837 B2 | 11/2012 | Takami et al. | |
| 8,512,590 B2 | 8/2013 | Takami et al. | |
| 8,591,760 B2 | 11/2013 | Yanagida et al. | |
| 9,162,928 B2 * | 10/2015 | Oda | C04B 35/2633 |
| 9,401,235 B2 * | 7/2016 | Kobayashi | C01G 49/0054 |
| 2009/0022992 A1 | 1/2009 | Takami et al. | |
| 2009/0218540 A1 | 9/2009 | Takami et al. | |
| 2009/0261288 A1 | 10/2009 | Hosokawa et al. | |
| 2009/0314981 A1 | 12/2009 | Yanagida et al. | |
| 2011/0024672 A1 | 2/2011 | Takami et al. | |
| 2012/0211910 A1 | 8/2012 | Takami et al. | |

FOREIGN PATENT DOCUMENTS

| | | |
|---|---|---|
| JP | 60152009 | 8/1985 |
| JP | 10-149910 A | 6/1998 |
| JP | 11-154604 A | 6/1999 |
| JP | 3181559 B2 | 7/2001 |
| JP | 2006-104050 A | 4/2006 |
| JP | 2007-123511 A | 5/2007 |
| JP | 2007290956 A | 11/2007 |
| JP | 2008-137879 A | 6/2008 |
| JP | 2008311534 A | 12/2008 |
| JP | 2009-001476 A | 1/2009 |
| JP | 2009120442 A | 6/2009 |
| WO | 2007/060757 | 5/2007 |
| WO | 2007/077811 A1 | 7/2007 |
| WO | 2007105398 A1 | 9/2007 |
| WO | 2008/105449 A1 | 9/2008 |
| WO | 2008146712 A1 | 12/2008 |
| WO | 2011115129 | 9/2011 |

OTHER PUBLICATIONS

Supplementary European Search Report issued in corresponding EP Application No. 10794001.7, dated Oct. 28, 2013.

* cited by examiner

METHOD FOR PRODUCING SINTERED FERRIT MAGNET, AND SINTERED FERRITE MAGNET

This is a continuation of U.S. application Ser. No. 13/381,526 Dec. 29, 2011, which is a national stage of PCT/JP2010/060280 filed on Jun. 17, 2010, claiming priority based on Japanese Patent Application No. 2009-156297, filed Jun. 30, 2009, the contents of all of which are incorporated herein by reference in their entirety.

FIELD OF THE INVENTION

The present invention relates to a method for producing a sintered ferrite magnet, and a sintered ferrite magnet.

BACKGROUND OF THE INVENTION

Sintered ferrite magnets are used in various applications such as motors, power generators, speakers, etc. Known as typical sintered ferrite magnets are Sr ferrite ($SrFe_{12}O_{19}$) and Ba ferrite ($BaFe_{12}O_{19}$) each having a hexagonal M-type magnetoplumbite structure. These sintered ferrite magnets are produced from starting materials comprising iron oxide, carbonates of strontium (Sr) or barium (Ba), etc. by a powder metallurgy method at a relatively low cost.

Recently, to provide smaller, lighter-weight, higher-performance electronic parts for automobiles, parts for electric appliances, etc. for environmental advantages, sintered ferrite magnets are required to have higher performance. Particularly desired for motors for automobiles are sintered ferrite magnets having, in addition to high residual magnetic flux density $B_r$, such high coercivity $H_{cJ}$ as to avoid demagnetization by a demagnetizing field generated when thinned.

To provide sintered ferrite magnets with improved magnetic properties, proposals have been made to improve coercivity $H_{cJ}$ and a residual magnetic flux density $B_r$ by substituting part of Sr with a rare earth element such as La, etc., and substituting part of Fe with Co in the above Sr ferrite (for example, JP 10-149910 A, and JP 11-154604 A).

The Sr ferrite with part of Sr substituted by a rare earth element such as La, etc. and part of Fe substituted by Co, etc. (hereinafter referred to as "Sr—La—Co ferrite"), which is described in JP 10-149910 A and JP 11-154604 A, has excellent magnetic properties, finding various applications in place of conventional Sr or Ba ferrite. However, further improvement in magnetic properties is desired.

Also known for the sintered ferrite magnets together with the above Sr or Ba ferrite is Ca ferrite. It is known that the Ca ferrite has a stable structure represented by the formula of $CaO—Fe_2O_3$ or $CaO—2Fe_2O_3$, forming hexagonal ferrite by the addition of La. However, it has magnetic properties on substantially the same levels as those of conventional Ba ferrite, not sufficiently high.

To improve a residual magnetic flux density $B_r$ and coercivity $H_{cJ}$ as well as the temperature characteristics of coercivity $H_{cJ}$, Japanese Patent 3181559 discloses Ca ferrite with part of Ca substituted by a rare earth element such as La, etc. and part of Fe substituted by Co, etc. (hereinafter referred to as "Ca—La—Co ferrite"), which has an anisotropic magnetic field $H_A$ of 20 kOe or more, higher by 10% or more than that of Sr ferrite.

However, the Ca—La—Co ferrite described in Japanese Patent 3181559 has substantially the same $B_r$ and $H_{cJ}$ as those of Sr—La—Co ferrite, despite a higher anisotropic magnetic field $H_A$ than that of the Sr—La—Co ferrite. In addition, having an extremely poor squareness ratio, it does not meet high coercivity and a high squareness ratio simultaneously, failing to be used for various applications such as motors, etc.

With respect to the Sr—La—Co ferrite proposed by JP 10-149910 A and JP 11-154604 A, JP 2007-123511 A proposes a method for improving $H_{cJ}$ while maintaining $B_r$. In general, a sintered ferrite magnet is produced by the steps of (1) mixing iron oxide with carbonate of Sr or Ba, etc. as starting materials, (2) calcining a starting material mixture for ferritization to obtain a calcined body, (3) pulverizing the calcined body to powder, (4) molding the powder to a green body, and (5) sintering the green body to obtain a sintered body. JP 2007-123511 A discloses a pulverization step comprising a first fine pulverization step, a powder heat-treating step and a second fine pulverization step, by which the percentage of crystals as large as 1.1 μm or less is made 95% or more, improving $H_{cJ}$.

Though $H_{cJ}$ is improved by the method of JP 2007-123511 A, cost increase is unavoidable due to increase in the number of production steps. Particularly, Sr—La—Co ferrite containing expensive elements such as Co, La, etc. as indispensable components suffers a higher material cost than conventional Sr ferrite. Higher production cost deprives sintered ferrite magnets of the most important economic advantages, failing to meet cost requirements in the market.

Various measures for improving performance have been conducted on the Ca—La—Co ferrite proposed by Japanese Patent 3181559. For example, JP 2006-104050 A proposes Ca—La—Co ferrite containing La and Co at predetermined percentages with the molar ratios of elements and the value of n optimized. WO 2007/060757 proposes Ca—La—Co ferrite with part of Ca substituted by La and Ba. WO 2007/077811 proposes Ca—La—Co ferrite with part of Ca substituted by La and Sr. However, the Ca—La—Co ferrites of JP 2006-104050 A, WO 2007/060757 and WO 2007/077811 fail to provide sintered ferrite magnets having high $H_{cJ}$ satisfying demands in the market.

JP 2008-137879 A and WO 2008/105449 disclose a technology for improving $H_{cJ}$ by using the pulverization step described in JP 2007-123511 A in the production of Ca—La—Co ferrite. Though the Ca—La—Co ferrites described in JP 2008-137879 A and WO 2008/105449 have improved $H_{cJ}$, they doubly suffer increase in a material cost and a production cost as in JP 2007-123511 A, failing to meet cost requirements in the market.

Thus, sintered ferrite magnets meeting recent requirements of magnetic properties and costs have not been proposed yet.

It is known to add $SiO_2$, $CaCO_3$, etc. as sintering aids to sintered ferrite magnets, to change balance between $B_r$ and $H_{cJ}$, which are in a trade-off relation in the sintered ferrite magnets. To obtain high $B_r$, it is effective to reduce the amounts of sintering aids acting as non-magnetic components in a range having liquid phase components necessary for sintering, or to increase the amount of $CaCO_3$ relative to that of $SiO_2$. However, such measures make it difficult to maintain fine sintered structures, resulting in low $H_{cJ}$. On the other hand, to obtain high $H_{cJ}$, it is effective to increase the amounts of sintering aids, or to increase the amount of $SiO_2$ relative to that of $CaCO_3$. However, such measures increase the amounts of non-magnetic components or lower sinterability, inevitably resulting in decrease in $B_r$ and a squareness ratio $H_k/H_{cJ}$, wherein $H_k$ was the value of H at J of $0.95B_r$ on a curve of J (intensity of magnetization) to H (intensity of a magnetic field) in the second quadrant.

In conventional sintered ferrite magnets, particularly in Sr—La—Co ferrite and Ca—La—Co ferrite proposed recently, the amounts of sintering aids such as $SiO_2$, $CaCO_3$, etc. are generally as small as possible to maintain high $B_r$. For example, JP 2006-104050 A describes that 0.3-1.5% by mass (calculated as CaO) of $CaCO_3$ and 0.2-1.0% by mass of $SiO_2$ are added preferably at the time of pulverizing a calcined body. WO 2007/060757 describes that 0.2-1.5% by mass (0.112-0.84% by mass when calculated as CaO) of $CaCO_3$, and 0.1-1.5% by mass of $SiO_2$ are added preferably at the time of pulverizing a calcined body. JP 2008-137879 A describes that 1.35% or less by mass of $SiO_2$ is preferably added to a sintering material.

However, JP 2006-104050 A, WO 2007/060757 and JP 2008-137879 A describe in Examples only Ca—La—Co ferrite magnets, in which the amounts of both $SiO_2$ and $CaCO_3$ (calculated as CaO) are 0.9% or less by mass. Because emphasis is placed on the improvement of the $B_r$ of these ferrite magnets, the addition of $SiO_2$ and $CaCO_3$ in amounts of more than 0.9% by mass is not contemplated, providing no information about the magnetic properties ($B_r$, $H_{cJ}$ and $H_k/H_{cJ}$) of such Ca—La—Co ferrite magnets.

OBJECT OF THE INVENTION

Accordingly, an object of the present invention is to provide a sintered Ca—La—Co ferrite magnet having extremely improved $H_{cJ}$ while maintaining high $B_r$ and squareness ratio $H_k/H_{cJ}$ without suffering increase in a material cost and a production cost, which can therefore be made thinner, and a method for producing such sintered ferrite magnet at a low cost.

DISCLOSURE OF THE INVENTION

As a result of intensive research in view of the above object, the inventors have paid attention to sintering aids added at a pulverization step, finding that in Ca—La—Co ferrite, (a) the addition of $SiO_2$ in an amount exceeding 1% by mass as a sintering aid specifically increases $H_{cJ}$; (b) by adding 1% or more by mass of $CaCO_3$ depending on the amount of $SiO_2$ added, decrease in $B_r$ and $H_k/H_{cJ}$ can be avoided as much as possible; therefore, (c) a sintered ferrite magnet having high $H_{cJ}$ with high $B_r$ and $H_k/H_{cJ}$ maintained, which has not been obtained so far, is produced. The present invention has been completed based on such finding.

The specific increase in $H_{cJ}$ by the addition of $SiO_2$ in an amount exceeding 1% by mass is a phenomenon peculiar to the Ca—La—Co ferrite. In the Sr—La—Co ferrites described in JP 10-149910 A and JP 11-154604 A, the addition of $SiO_2$ and $CaCO_3$ in amounts exceeding 1% by mass provides only small increase in $H_{cJ}$, accompanied by extreme decrease in $B_r$ and $H_k/H_{cJ}$ (see Example 3 below).

Measurement by the inventors using a singular point detection (SPD) method has revealed that Ca—La—Co ferrite in which the atomic ratio of Co is 0.3 has an anisotropic magnetic field $H_A$ of 2.1 MA/m (about 26.4 kOe), higher than 1.8 MA/m (about 22.6 kOe) of general Sr—La—Co ferrite in which the atomic ratio of Co is 0.2. Namely, it is expected for Ca—La—Co ferrite to have higher $H_{cJ}$ than that of Sr—La—Co ferrite. The details of the SPD method is described in Asti and S. Rinaldi, J. Appl. Phys., 45 (1974), pp. 3600-3610.

However, the Ca—La—Co ferrite magnets having a Co atomic ratio of 0.3, which are described in Examples of JP 2006-104050 A, WO 2007/060757 and JP 2008-137879 A, have $H_{cJ}$ of about 400 kA/m (about 5 kOe) at highest. $H_{cJ}$ of about 400 kA/m is obtained even in the Sr—La—Co ferrite having a Co atomic ratio of 0.2 (JP 2007-123511 A). Namely, though the Ca—La—Co ferrite magnets described in Examples of JP 2006-104050 A, WO 2007/060757 and JP 2008-137879 A have a higher anisotropic magnetic field $H_A$ than that of the Sr—La—Co ferrite, they have substantially the same $H_{cJ}$ as that of the Sr—La—Co ferrite, not improved to an expected level, and thus failing to exhibit potential inherent in the materials. The fact that $H_{cJ}$ is specifically improved by the addition of $SiO_2$ in an amount exceeding 1% by mass in the present invention is a phenomenon peculiar to the Ca—La—Co ferrite, providing a remarkable effect of achieving properties close to potential inherent in the materials.

Thus, the method of the present invention for producing a sintered ferrite magnet comprising (a) a ferrite phase having a hexagonal M-type magnetoplumbite structure, and (b) a grain boundary phase indispensably containing Si, comprises a step of preparing a calcined body of ferrite comprising a ferrite phase having a hexagonal M-type magnetoplumbite structure comprising Ca, an element R which is at least one of rare earth elements and indispensably includes La, an element A which is Ba and/or Sr, Fe, and Co as indispensable elements, the composition of metal elements of Ca, R, A, Fe and Co being represented by the general formula of $Ca_{1-x-y}R_xA_yFe_{2n-z}Co_z$, wherein the atomic ratios of Ca (1-x-y), the element R (x), the element A (y) and Co (z), and the molar ratio of n meet the following relations:

$0.3 \le (1-x-y) \le 0.65$, $0.2 \le x \le 0.65$, $0 \le y \le 0.2$, $0.03 \le z \le 0.65$, and $4 \le n \le 7$;

a step of pulverizing the calcined body to powder;
a step of molding the powder to a green body; and
a step of sintering the green body to obtain a sintered body;
before the pulverization step, more than 1% by mass and 1.8% or less by mass of $SiO_2$ being added to 100% by mass of the calcined body.

1-2% by mass (calculated as CaO) of $CaCO_3$ is preferably added to 100% by mass of the calcined body, before the pulverization step.

The amount of the $SiO_2$ added is preferably 1.1-1.6% by mass.

The amount of the CaO added is preferably 1.2-2% by mass.

The above (1-x-y), x, y and z and n are preferably $0.35 \le (1-x-y) \le 0.55$, $0.4 \le x \le 0.6$, $0 \le y \le 0.15$, $0.1 \le z \le 0.4$, and $4.5 \le n \le 6$.

The above (1-x-y), x, y and z and n are more preferably $0.42 \le (1-x-y) \le 0.5$, $0.45 \le x \le 0.55$, $0 \le y \le 0.08$, 0.2≤z≤0.3, and 4.8≤n≤5.2.

The above pulverization step preferably comprises a first fine pulverization step, a step of heat-treating powder obtained by the first fine pulverization step, and a second fine p. ulverization step of pulverizing the heat-treated powder again.

The sintered ferrite magnet of the present invention comprises (a) a ferrite phase having a hexagonal M-type magnetoplumbite structure comprising Ca, an element R which is at least one of rare earth elements and indispensably includes La, an element A which is Ba and/or Sr, Fe, and Co as indispensable elements, the composition of metal elements of Ca, R, A, Fe and Co being represented by the general formula of $Ca_{1-x-y}R_xA_yFe_{2n-z}Co_z$, wherein the atomic ratios of Ca (1-x-y), the element R (x), the element A (y) and Co (z), and the molar ratio of n meet the following relations:

$0.3 \le (1-x-y) \le 0.65$, $0.2 \le x \le 0.65$, $0 \le y \le 0.2$, $0.03 \le z \le 0.65$, and $4 \le n \le 7$, and (b) a grain boundary phase indispensably containing Si, the amount of Si being more than 1% by mass and 1.8% or less by mass (calculated as $SiO_2$), based on the entire sintered ferrite magnet.

The amount of Si is preferably 1.1-1.6% by mass (calculated as $SiO_2$), based on the entire sintered ferrite magnet.

The above (1-x-y), x, y and z and n are preferably $0.35 \le (1-x-y) \le 0.55$, $0.4 \le x \le 0.6$, $0 \le y \le 0.15$, $0.1 \le z \le 0.4$, and $4.5 \le n \le 6$.

The above (1-x-y), x, y and z and n are more preferably $0.42 \le (1-x-y) \le 0.5$, $0.45 \le x \le 0.55$, $0 \le y \le 0.08$, $0.2 \le z \le 0.3$, and $4.8 \le n \le 5.2$.

DESCRIPTION OF THE PREFERRED EMBODIMENTS

[1] Sintered Ferrite Magnet

Figure 1:
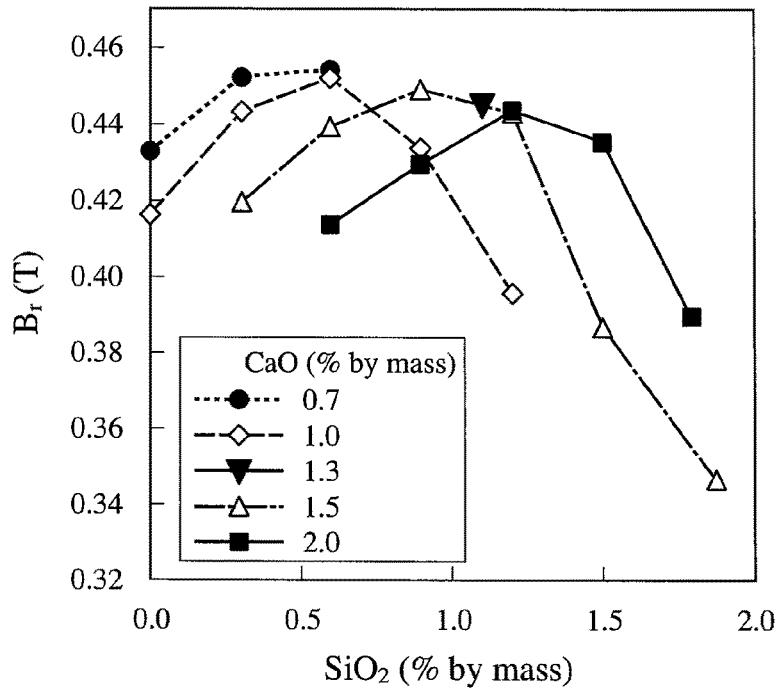
FIG. 1 is a graph showing the relation between the amount of $SiO_2$ added and a residual magnetic flux density $B_r$ in the sintered ferrite magnet of Example 1.

The sintered ferrite magnet of the present invention comprises (a) a ferrite phase having a hexagonal M-type magnetoplumbite structure comprising Ca, an element R which is at least one of rare earth elements and indispensably includes La, an element A which is Ba and/or Sr, Fe, and Co as indispensable elements, the composition of metal elements of Ca, R, A, Fe and Co being represented by the general formula of $Ca_{1-x-y}R_xA_yFe_{2n-z}Co_z$, wherein the atomic ratios of Ca (1-x-y), the element R (x), the element A (y) and Co (z), and the molar ratio of n meet the following relations:

$$0.3 \leq (1-x-y) \leq 0.65,$$

$$0.2 \leq x \leq 0.65,$$

$$0 \leq y \leq 0.2,$$

$$0.03 \leq z \leq 0.65, \text{ and}$$

$$4 \leq n \leq 7; \text{ and}$$

(b) a grain boundary phase indispensably containing Si, the amount of the above Si being more than 1% by mass and 1.8% or less by mass (calculated as $SiO_2$), based on the entire sintered ferrite magnet.

The Ca content (1-x-y) is $0.3 \leq (1-x-y) \leq 0.65$. When Ca is less than 0.3, the amounts of the elements R and A are relatively large, undesirably resulting in low $B_r$ and $H_k/H_{cJ}$. When Ca is more than 0.65, the amounts of the elements R and A are relatively small, undesirably resulting in low $B_r$ and $H_k/H_{cJ}$. The range of (1-x-y) is preferably $0.35 \leq (1-x-y) \leq 0.55$, more preferably $0.42 \leq (1-x-y) \leq 0.5$.

The element R is at least one of rare earth elements, indispensably including La. To obtain high magnetic properties, the percentage of La in the element R is preferably 50 atomic % or more, more preferably 70 atomic % or more, most preferably La alone except for inevitable impurities. because La is most dissolvable in the M phase among the elements R, the larger percentage of La provides larger effects of improving magnetic properties. The amount (x) of the element R is $0.2 \leq x \leq 0.65$. When x is less than 0.2 or more than 0.65, low $B_r$ and $H_k/H_{cJ}$ are provided. The range of x is preferably $0.4 \leq x \leq 0.6$, more preferably $0.45 \leq x \leq 0.55$.

The element A is Ba and/or Sr. The amount (y) of the element A is $0 \leq y \leq 0.2$. Although the effects of the present invention would not be deteriorated even if the element A were not added, the addition of the element A makes crystals finer in the calcined body with smaller aspect ratios, resulting in improved $H_{cJ}$. The range of y is $0 \leq y \leq 0.15$, more preferably $0 \leq y \leq 0.08$.

The amount (z) of Co is $0.03 \leq z \leq 0.65$. When z is less than 0.03, the addition of Co does not provide effects of improving magnetic properties. Also, because unreacted $\alpha$-$Fe_2O_3$ remains in the calcined body, a slurry tends to leak from a mold cavity during wet molding. When z is more than 0.65, undesired phases containing a large amount of Co are formed, resulting in largely decreased magnetic properties. The range of z is preferably $0.1 \leq z \leq 0.4$, more preferably $0.2 \leq z \leq 0.3$.

Part of Co may be substituted by at least one of Zn, Ni and Mn. Particularly, the partial substitution of Co with Ni and Mn reduces production cost without lowering the magnetic properties. Also, the partial substitution of Co with Zn improves $B_r$, despite slightly reduced $H_{cJ}$. The total amount of substituting Zn, Ni and Mn is preferably 50 mol % or less of Co.

In the Ca—La—Co ferrite, increase in the amounts of Co and La essentially results in improvement in $H_{cJ}$. However, because Co and La are rare metals, which are rare and expensive, their contents are desirably as small as possible for the purposes of reducing resource consumption and lowering the prices of sintered ferrite magnets. Because $H_{cJ}$ can be extremely improved while maintaining high $B_r$ and squareness ratio $H_k/H_{cJ}$ by the present invention, the amounts of Co and La can be reduced to provide magnets having the same $H_{cJ}$ as that of the conventional sintered Ca—La—Co ferrite magnets. It makes it possible to obtain $H_{cJ}$ on a practical level even in compositions containing Co at an atomic ratio of 0.2, whose practical use has been difficult because high $H_{cJ}$ cannot be expected, thereby providing inexpensive, high-performance sintered ferrite magnets containing reduced amounts of Co and La.

The value of n represents a molar ratio of (Fe+Co) to (Ca+R+A), 2n=(Fe+Co)/(Ca+R+A). The molar ratio n is preferably $4 \leq n \leq 7$. When n is less than 4, the magnet contains a large percentage of non-magnetic portions with excessively flat calcined particles, resulting in drastically reduced $H_{cJ}$. When n is more than 7, the unreacted $\alpha$-$Fe_2O_3$ remains in the calcined body, resulting in the leakage of a slurry from a mold cavity during wet molding. The range of n is preferably $4.5 \leq n \leq 6$, more preferably $4.8 \leq z \leq 5.2$.

Si is an indispensable element, and contained in an amount of more than 1% by mass and 1.8% or less by mass (calculated as $SiO_2$) based on the entire magnet. Si is preferably added in the form of $SiO_2$ to the calcined ferrite, and the amount of $SiO_2$ added is preferably more than 1% by mass and 1.8% or less by mass based on 100% by mass of the calcined body. $SiO_2$ added to the calcined body essentially remains in the sintered magnet, too, without change. It should be noted, however, that some of $SiO_2$ may flow out in the pulverization step and the molding step, resulting in a smaller amount in the sintered magnet than in the calcined body. Si essentially forms the grain boundary phase, without being contained in the ferrite phase having a hexagonal M-type magnetoplumbite structure. The preferred range of Si is 1.1-1.6% by mass (calculated as $SiO_2$).

A molar ratio range x/z of the element R to Co is preferably $0.73 \leq x/z \leq 15.62$, more preferably $1 \leq x/z \leq 3$, most preferably $1.2 \leq x/z \leq 2$. By selecting the composition meeting these values, the magnetic properties can be improved.

In the present invention, large effects of improving magnetic properties are obtained when the amount of the element R>the amount of Co>the amount of the element A, namely, x>z>y. Also, when the amount of Ca>the amount of the element A, namely, (1-x-y)>y, large effects of improving magnetic properties are obtained.

The sintered ferrite magnet of the present invention, and the calcined body used for producing it have a ferrite phase having a hexagonal M-type magnetoplumbite structure. The term "having a hexagonal M-type magnetoplumbite structure" used herein means that the X-ray diffraction pattern of the hexagonal M-type magnetoplumbite structure is mainly observed when the X-ray diffraction of the sintered ferrite magnet or the calcined body is measured under general conditions. There may be undesired phases (orthoferrite phase, spinel phase, etc.) and impurity phases in extremely small amounts (about 5% or less by mass) observed by X-ray diffraction, etc. The quantitative measurement of undesired phases by X-ray diffraction can be conducted by a Rietveld analysis method.

The sintered ferrite magnet of the present invention indispensably comprises the ferrite phase having a hexagonal M-type magnetoplumbite structure, and the grain boundary phase indispensably containing Si. Because the grain boundary phase cannot easily be observed by an X-ray diffraction pattern, it is preferably confirmed by a transmission electron microscope, etc.

In the present invention, both the calcined ferrite and the sintered ferrite magnet have the same ferrite phase, which has a hexagonal M-type magnetoplumbite structure. The calcined ferrite preferably contains the ferrite phase as a main component for the orientation of crystals in the molding and structure control in the sintering, the existence of the grain boundary phase being not critical. On the other hand, the sintered ferrite magnet contains the ferrite phase as a main component, and needs the grain boundary phase indispensably containing Si for structure control and densification in the sintering process.

With the above preferred ranges, the sintered ferrite magnet of the present invention has magnetic properties such as coercivity $H_{cJ}$ of 450 kA/m or more, a residual magnetic flux density $B_r$ of 0.4 T or more, and a squareness ratio $H_k/H_{cJ}$ of 80% or more. With more preferred ranges, it has magnetic properties such as coercivity $H_{cJ}$ of 460 kA/m or more, a residual magnetic flux density $B_r$ of 0.44 T or more, and a squareness ratio $H_k/H_{cJ}$ of 80% or more.

[2] Production Method of Sintered Ferrite Magnet

The sintered ferrite magnet is produced by a step of preparing calcined ferrite, a step of pulverizing the calcined ferrite to powder, a step of molding the powder to green body, and a step of sintering the green body to a sintered body. Before the pulverization step, more than 1% by mass and 1.8% or less by mass of $SiO_2$ can be added to 100% by mass of the calcined body to provide the sintered magnet with remarkably improved coercivity $H_{cJ}$.

The calcined ferrite comprises a ferrite phase having a hexagonal M-type magnetoplumbite structure comprising Ca, the element R which is at least one of rare earth elements and indispensably includes La, the element A which is Ba and/or Sr, Fe, and Co as indispensable elements, the composition of metal elements of Ca, R, A, Fe and Co being represented by the general formula of $Ca_{1-x-y}R_xA_yFe_{2n-z}Co_z$, wherein the atomic ratios of Ca (1-x-y), the element R (x), the element A (y) and Co (z), and the molar ratio of n meet the following relations: $0.3 \leq (1-x-y) \leq 0.65$, $0.2 \leq x \leq 0.65$, $0 \leq y \leq 0.2$, $0.03 \leq z \leq 0.65$, and $4 \leq n \leq 7$.

The composition of the calcined ferrite including 0 (oxygen) is represented by the general formula of $Ca_{1-x-y}R_xA_yFe_{2n-z}Co_zO_\alpha$, wherein (1-x-y), x, y, z, $\alpha$ represents the atomic ratios of Ca, the element R, the element A, Co and O, and n represents a molar ratio, meeting $0.3 \leq (1-x-y) \leq 0.65$, $0.2 \leq x \leq 0.65$, $0 \leq y \leq 0.2$, $0.03 \leq z \leq 0.65$, and $4 \leq n \leq 7$, and $\alpha = 19$ at a stoichiometric composition ratio in which the element R and Fe are trivalent, Co is bivalent, x=z, and n=6.

In the composition of the above calcined ferrite including O (oxygen), the mole ratio of oxygen may differ depending on the valences of Fe and Co, the value of n, and the kind of the element R. Also, in the sintered ferrite magnet, a ratio of oxygen to the metal element may change depending on the vacancy of oxygen when sintered in a reducing atmosphere, the change of the valences of Fe and Co in the ferrite phase, etc. Accordingly, the actual molar ratio $\alpha$ of oxygen may be deviated from 19. Therefore, the composition of metal elements, which are most easily identified, are used in the present invention.

(1) Step of Preparing Calcined Ferrite

The calcined ferrite is produced by mixing oxide powders and powders of compounds such as Ca compounds, compounds of the elements R, Ba and/or Sr compounds, if necessary, iron compounds, and Co compounds, which are converted to oxides by calcining, to the above composition; and calcining (ferritizing) the resultant mixture. The composition ranges of Ca, the element R, the element A, Fe and Co are restricted for the same reasons as in the case of the sintered ferrite magnet.

Usable as the starting material powders are powders of metals in the form of oxides, carbonates, hydroxides, nitrates, chlorides, etc., regardless of their valences. Solutions of starting material powders may also be used. Used as the Ca compounds are carbonates, oxides, chlorides, etc. of Ca. Used as the compounds of the elements R are oxides such as $La_2O_3$, hydroxides such as $La(OH)_3$, carbonates such as $La_2(CO_3)_3 \cdot 8H_2O$, etc. Particularly, the oxides, hydroxides, carbonates, etc. of mixed rare earth elements (La, Nd, Pr, Ce, etc.) are preferable because they are inexpensive, enabling cost reduction. Used as the compounds of the elements A are carbonates, oxides, chlorides, etc. of Ba and/or Sr. Used as the iron compounds are iron oxides, iron hydroxides, iron chlorides, mill scales, etc. Used as the Co compounds are oxides such as CoO, $Co_3O_4$, etc., hydroxides such as CoOOH, $Co(OH)_2$, $Co_3O_4 \cdot m_1H_2O$ ($m_1$ is a positive number), etc., carbonates such as $CoCO_3$, and basic carbonates such as $m_2CoCO_3 \cdot m_3Co(OH)_2 \cdot m_4H_2O$, etc. ($m_2$, $m_3$ and $m_4$ are positive numbers).

Other starting material powders than $CaCO_3$, $Fe_2O_3$ and $La_2O_3$ may be added at the time of mixing starting materials or after the calcination. For example, the sintered ferrite magnet can be produced, (1) by mixing $CaCO_3$, $Fe_2O_3$, $La_2O_3$ and $Co_3O_4$, calcining the resultant mixture, and pulverizing, molding and sintering the calcined body, or (2) by mixing $CaCO_3$, $Fe_2O_3$ and $La_2O_3$, calcining the resultant mixture, adding $Co_3O_4$ to the calcined body, and pulverizing, molding and sintering the calcined body.

To accelerate a reaction during calcining, about 1% or less by mass of a B-containing compound such as $B_2O_3$, $H_3BO_3$, etc. may be added, if necessary. Particularly, the addition of $H_3BO_3$ is effective for improving $H_{cJ}$ and $B_r$. The amount of $H_3BO_3$ added is more preferably 0.3% or less by mass, most preferably about 0.2% by mass. Less than 0.1% by mass of $H_3BO_3$ provides only a small effect of improving $B_r$, and more than 0.3% by mass of $H_3BO_3$ reduces $B_r$. Because $H_3BO_3$ has effects of controlling the shapes and sizes of crystal grains during sintering, it may be added after calcining (before fine pulverization or before sintering), or both before and after calcining.

The mixing of the starting material powders may be conducted in a wet or dry state. When stirred with media such as steel balls, etc., the starting material powders can be mixed more uniformly. In the case of wet mixing, the solvent is preferably water. To increase the dispersibility of the starting material powders, known dispersants such as ammonium polycarboxylate, calcium gluconate, etc. may be used. A slurry of the starting materials is dewatered to obtain mixed starting material powders.

The mixed starting material powders are heated in an electric furnace, a gas furnace, etc. to cause a solid-phase reaction, thereby forming a ferrite compound having a hexagonal M-type magnetoplumbite structure. This process is called "calcining," and the resultant compound is called "calcined body."

The calcining step is conducted preferably in an atmosphere having an oxygen concentration of 5% or more. The oxygen concentration of less than 5% results in abnormal grain growth, the formation of undesired phases, etc. More preferably, the oxygen concentration is 20% or more.

In the calcining step, the solid-phase reaction forming the ferrite phase proceeds as the temperature is elevated, and is completed at about 1100° C. When the calcining temperature is lower than 1100° C., the unreacted hematite (iron oxide) remains, resulting in low magnetic properties. On the other hand, when the calcining temperature is higher than 1450° C., crystal grains grow excessively, likely needing a long period of time for the pulverization step. Accordingly, the calcining temperature is preferably 1100-1450° C., more preferably 1200-1350° C. The calcining time is preferably 0.5-5 hours.

When $H_3BO_3$ is added before calcining, the ferritization reaction is accelerated, enabling calcining at 1100-1300° C.

(2) Addition of $SiO_2$

The production method of the present invention is characterized by adding more than 1% by mass and 1.8% or less by mass of $SiO_2$ to 100% by mass of the calcined body before the pulverization step. This specifically improves $H_{cJ}$. The addition of 1% or less by mass of $SiO_2$ fails to obtain an effect of improving $H_{cJ}$, and the addition of more than 1.8% by mass of $SiO_2$ undesirably reduces $H_{cJ}$, $B_r$, and $H_k/H_{cJ}$. The more preferred amount of $SiO_2$ added is 1.1-1.6% by mass.

Though $SiO_2$ is most preferably added to the calcined body, part of $SiO_2$ may be added before calcining (when mixing the starting material powders). With $SiO_2$ added before calcining, the size control of crystal grains can be conducted in calcining.

(3) Addition of $CaCO_3$

Depending on the amount of $SiO_2$ added, 1-2% by mass (calculated as CaO) of $CaCO_3$ is preferably added to 100% by mass of the calcined body before the pulverization step. The addition of $CaCO_3$ prevents the decrease of $B_r$ and $H_k/H_{cJ}$ as much as possible, resulting in sintered ferrite magnets having high $H_{cJ}$ with high $B_r$ and $H_k/H_{cJ}$ maintained, which have not been achieved conventionally. When the amount of $CaCO_3$ (calculated as CaO) is less than 1% by mass or more than 2% by mass, $B_r$ and $H_k/H_{cJ}$ are undesirably low. The amount of $CaCO_3$ added is more preferably 1.2-2% by mass.

The preferred amount of $SiO_2$ added may slightly change depending on the amount of $CaCO_3$ (calculated as CaO). As shown in Examples below, it slightly changes also depending on the amount (z) of Co. For example, from the aspect of improving $H_{cJ}$, increase in the amount of $CaCO_3$ added tends to shift the preferred amount of $SiO_2$ to a higher side, regardless of the amount (z) of Co. Also, decrease in the amount of Co tends to shift the preferred amount of $SiO_2$ to a higher side. However, too much $SiO_2$ reduces $B_r$ and $H_k/H_{cJ}$. To achieve high $H_{cJ}$ while maintaining high $B_r$ and $H_k/H_{cJ}$, it is preferable to add $SiO_2$ in an amount of 1.1-1.5% by mass and $CaCO_3$ in an amount of 1.2-2% by mass (calculated as CaO) when the amount (z) of Co is z≥0.3, and to add $SiO_2$ in an amount of 1.4-1.6% by mass and $CaCO_3$ in an amount of 1.5-2% by mass (calculated as CaO) when the amount (z) of Co is z<0.3. Considering both cases, as described above, the amount of $SiO_2$ added is preferably 1.1-1.6% by mass. In this case, the amount (calculated as CaO) of $CaCO_3$ added is preferably 1.2-2% by mass.

In the present invention, when both $SiO_2$ and $CaCO_3$ are added, the amounts of $SiO_2$ and $CaCO_3$ may be properly determined within the above ranges. As described above, it is preferable to add $SiO_2$ in a range of 1.1-1.6% by mass and $CaCO_3$ in a range of 1.2-2% by mass (calculated as CaO), providing sintered ferrite magnets with high $H_{cJ}$, with high $B_r$ and $H_k/H_{cJ}$ maintained.

When both $SiO_2$ and $CaCO_3$ are added, the magnetic properties can be improved by adjusting a ratio of the amount (calculated as CaO) of $CaCO_3$/the amount of $SiO_2$ to 0.8-2. In this case, the preferred range of [$CaCO_3$ (as CaO)/$SiO_2$] slightly changes depending on the amount (z) of Co as shown in Examples below. When Z≥0.3, the ratio is preferably 1-1.7, more preferably 1.1-1.4. When z<0.3, the ratio is preferably 0.8-1.4, more preferably 0.9-1.1. Considering both cases of z≥0.3 and z<0.3, the ratio is preferably 0.8-1.7, more preferably 0.9-1.4. With [$CaCO_3$ (as CaO)/$SiO_2$] set in the above range, the sintered ferrite magnets has high $H_{cJ}$, with high $B_r$ and $H_k/H_{cJ}$ maintained.

(4) Pulverization Step

The calcined body is pulverized by a vibration mill, a ball mill, an attritor, etc. to powder. The pulverized powder preferably has an average particle size of about 0.4-0.8 μm (measured by an air permeation method). The pulverization step may be either dry pulverization or wet pulverization, though their combination is preferable.

The wet pulverization uses water and/or non-aqueous solvents (organic solvents such as acetone, ethanol, xylene, etc.). The wet pulverization produces a slurry containing the calcined body in water (solvent). The slurry preferably contains known dispersant and/or surfactant in an amount of 0.2-2% by mass on a solid basis. After the wet pulverization, the slurry is preferably concentrated and kneaded.

In the pulverization step, $Cr_2O_3$, $Al_2O_3$, etc. may be added together with $SiO_2$ and $CaCO_3$ described above to improve the magnetic properties. Each of them is preferably 5% or less by mass.

Because the pulverized powder contains ultra-fine powder of less than 0.1 μm, which cause poor dewatering and molding defects, the pulverized powder is preferably heat-treated to remove the ultra-fine powder. The heat-treated powder is preferably pulverized again. Thus, using a pulverization step comprising a first fine pulverization step, a step of heat-treating powder obtained by the first fine pulverization step, and a second fine pulverization step of pulverizing the heat-treated powder again, which is called "heat-treating, repulverizing step," $H_{cJ}$ can be further improved in addition to the effect of improving $H_{cJ}$ by the addition of $SiO_2$ and $CaCO_3$, thereby providing sintered ferrite magnets with extremely high $H_{cJ}$, with high $B_r$ and $H_k/H_{cJ}$ maintained, which have not been obtained so far.

Ultra-fine powder of less than 0.1 μm is likely to be inevitably formed in a usual pulverization step, and the existence of ultra-fine powder lowers $H_{cJ}$, results in poor dewatering in the molding step, provides green bodies with defects, and deteriorates pressing cycles because too much time is needed for dewatering. When the powder containing ultra-fine powder, which is obtained by the first fine pulverization step, is heat-treated, a reaction occurs between powder having relatively large particle sizes and the ultra-fine powder, resulting in decrease in the amount of the ultra-fine powder. In the second fine pulverization step, the particle sizes are controlled with necking removed, to produce powder with predetermined particle sizes. Thus, powder having an excellent particle size distribution with a small percentage of ultra-fine powder can be obtained, thereby improving $H_{cJ}$, and thus solving the above problems in the molding step.

Utilizing the effect of improving $H_{cJ}$ by the heat-treating, repulverizing step, the same $H_{cJ}$ as when using powder having an average particle size of about 0.4-0.8 μm, which is produced by a usual pulverization step, is obtained, even if powder obtained by the second fine pulverization step has relatively large particle sizes (for example, an average particle size of about 0.8-1.0 μm). Accordingly, time saving can be achieved by the second fine pulverization step, with improved dewatering and pressing cycle.

As described above, though the heat-treating, repulverizing step provides various advantages, cost increase due to increased production steps cannot be avoided. However, magnetic properties are much more improved by the heat-treating, repulverizing step in the production of the sintered ferrite magnet of the present invention than in the production of conventional sintered ferrite magnets, canceling the above cost increase. Accordingly, the heat-treating, repulverizing step is practically significant in the present invention.

The first fine pulverization may be the same as the above-described usual pulverization, using a vibration mill, a jet mill, a ball mill, an attritor, etc. The pulverized powder preferably has an average particle size of about 0.4-0.8 µm (measured by an air permeation method). The pulverization step may be either dry pulverization or wet pulverization, though their combination is preferable.

After the first fine pulverization step, a heat treatment is conducted preferably at 600-1200° C., more preferably 800-1100° C. Though not particularly restricted, the heat treatment time is preferably 1 second to 100 hours, more preferably about 1-10 hours.

The second fine pulverization after the heat treatment step uses a vibration mill, a jet mill, a ball mill, an attritor, etc., like the first fine pulverization. Because the desired particle sizes are already substantially obtained by the first fine pulverization step, the control of particle sizes and the removal of necking are mainly conducted in the second fine pulverization step. Accordingly, milder pulverization conditions due to the shortened pulverization time, etc. are preferably used in the second fine pulverization step than in the first fine pulverization step. Pulverization under the same conditions as in the first fine pulverization step undesirably forms ultra-fine powder again.

The average particle size of the powder after the second fine pulverization is preferably about 0.4-0.8 µm (measured by an air permeation method) as in a usual pulverization step when seeking higher $H_{cJ}$ than that of sintered ferrite magnets obtained by the usual pulverization step, and preferably 0.8-1.2 µm, more preferably about 0.8-1.0 µm (measured by an air permeation method) when seeking the saving of time in the pulverization step, improving dewatering and a pressing cycle, etc.

(5) Molding Step

A slurry after the pulverization is press-molded with or without a magnetic field while removing water (solvent). Press-molding in a magnetic field aligns the crystal orientation of powder particles, thereby drastically improving the magnetic properties. To improve the orientation further, a dispersant and a lubricant may be added in an amount of 0.01-1% by mass. Also, the slurry may be concentrated before molding, if necessary. The concentration is preferably conducted by centrifugal separation, filter pressing, etc.

(6) Sintering Step

The press-molded green body is degreased if necessary, and then sintered. The sintering is conducted in an electric furnace, a gas furnace, etc.

The sintering is conducted preferably in an atmosphere having an oxygen concentration of 10% or more. When the oxygen concentration is less than 10%, abnormal grain growth, the formation of undesired phases, etc. occur, resulting in deteriorated magnetic properties. The oxygen concentration is more preferably 20% or more, most preferably 100%.

The sintering temperature is preferably 1150-1250° C. The sintering time is preferably 0.5-2 hours. The sintered magnet has an average crystal particle size of about 0.5-2 µm.

After the sintering step, the sintered ferrite magnet is obtained through known production steps such as a machining step, a washing step, an inspection step, etc.

The present invention will be explained in more detail referring to Examples without intention of restricting it thereto.

EXAMPLE 1

$CaCO_3$ powder, $La(OH)_3$ powder, $Fe_2O_3$ powder and $Co_3O_4$ powder were mixed to have the formula of $Ca_{1-x-y}La_xA_yFe_{2n-z}Co_zO_{19-\delta}$, wherein x=0.5, y=0, z=0.3, n=5.2, and δ≥0, and 0.1% by mass of $H_3BO_3$ powder was added to the total amount (100% by mass) of the mixed powders to produce a starting material powder. This starting material powder was mixed by a wet ball mill for 4 hours, and granulated by drying. It was calcined at 1300° C. for 3 hours in the air, and the calcined body was coarsely pulverized by a hammer mill to obtain coarse powder.

$SiO_2$ powder and $CaCO_3$ powder (calculated as CaO) were added in the amounts shown in Table 1 to the above coarse powder, and fine pulverization was conducted by a wet ball mill using water as a solvent until its average particle size (measured by an air permeation method) became 0.55 µm. Each of the resultant fine powder slurries was molded in a magnetic field of about 1.3 T under pressure of about 50 MPa with a compression direction parallel to the direction of the magnetic field, while removing the solvent. Each of the resultant green bodies was sintered at 1200° C. for 1 hour in the air to obtain a sintered magnet.

Figure 2:
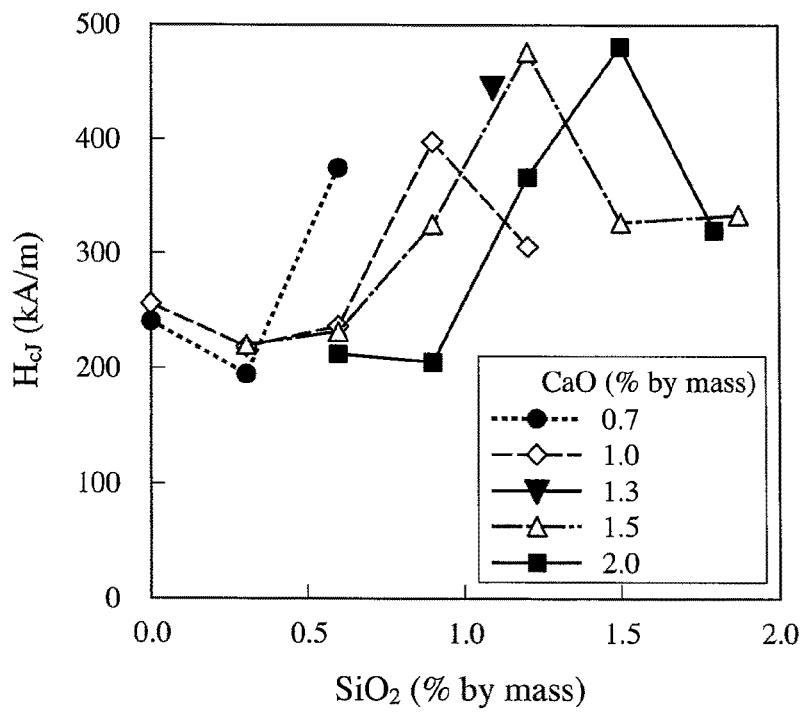
FIG. 2 is a graph showing the relation between the amount of $SiO_2$ added and coercivity $H_{cJ}$ in the sintered ferrite magnet of Example 1.
Figure 3:
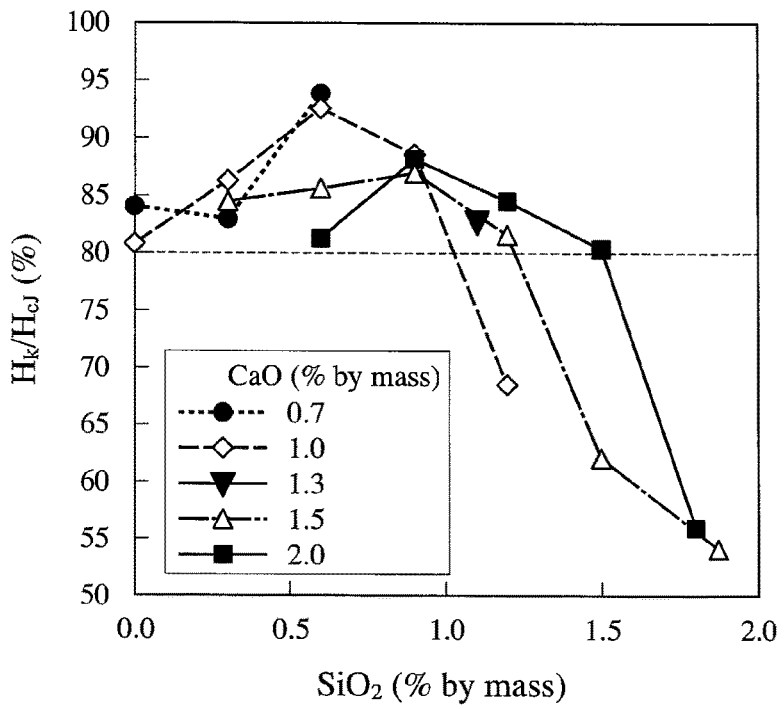
FIG. 3 is a graph showing the relation between the amount of $SiO_2$ added and a squareness ratio $H_k/H_{cJ}$ in the sintered ferrite magnet of Example 1.

Each sintered magnet was measured with respect to a residual magnetic flux density $B_r$, coercivity $H_{cJ}$, and a squareness ratio $H_k/H_{cJ}$, wherein $H_k$ was the value of H at J of 0.95B, on a curve of J (intensity of magnetization) to H (intensity of a magnetic field) in the second quadrant. The measurement results are shown in FIGS. 1-3. In FIGS. 1-3, the axes of abscissas represent the amount (% by mass) of $SiO_2$ added, and the axes of ordinates represent a residual magnetic flux density $B_r$ (T) (FIG. 1), coercivity $H_{cJ}$ (FIG. 2) and a squareness ratio $H_k/H_{cJ}$ (FIG. 3). In the figures, data obtained with the same amount of CaO were connected by straight lines. A dotted line at $H_k/H_{cJ}$=80% in FIG. 3 is a line as a measure for practical use. Even if a sintered magnet had high $B_r$ and $H_{cJ}$, it would not be able to be made thin when its $H_k/H_{cJ}$ is less than 80%, substantially failing to be useful for various applications such as electronic parts for automobiles, parts for electric appliances, etc. The same is true of Examples below.

TABLE 1

| Sample No. | CaO (% by mass) | SiO$_2$ (% by mass) | CaO/SiO$_2$ |
|---|---|---|---|
| 101 | 0.7 | 0.0 | — |
| 102 | 0.7 | 0.3 | 2.33 |
| 103 | 0.7 | 0.6 | 1.17 |
| 104 | 1.0 | 0.0 | — |
| 105 | 1.0 | 0.3 | 3.33 |
| 106 | 1.0 | 0.6 | 1.67 |
| 107 | 1.0 | 0.9 | 1.11 |
| 108* | 1.0 | 1.2 | 0.83 |
| 109* | 1.3 | 1.1 | 1.18 |
| 110 | 1.5 | 0.3 | 5.00 |
| 111 | 1.5 | 0.6 | 2.50 |
| 112 | 1.5 | 0.9 | 1.67 |
| 113* | 1.5 | 1.2 | 1.25 |
| 114* | 1.5 | 1.5 | 1.00 |
| 115 | 1.5 | 1.9 | 0.80 |
| 116 | 2.0 | 0.6 | 3.33 |
| 117 | 2.0 | 0.9 | 2.22 |
| 118* | 2.0 | 1.2 | 1.67 |
| 119* | 2.0 | 1.5 | 1.33 |
| 120* | 2.0 | 1.8 | 1.11 |

Note:
*Within the present invention.

As is clear from FIGS. 1-3, high magnetic properties are obtained when more than 1% by mass of $SiO_2$ and 1% or more by mass of CaO are added, and higher magnetic properties are obtained when 1.1-1.5% by mass of $SiO_2$ and when 1.3-2% by mass of CaO are added. Particularly, Sample 113 to which 1.2% by mass of $SiO_2$ and 1.5% by mass of CaO were added, and Sample 119 to which 1.5% by mass of $SiO_2$ and 2.0% by mass of CaO were added had specifically improved $H_{cJ}$ with maximally suppressed decrease in $B_r$ and KAU.

Figure 4:
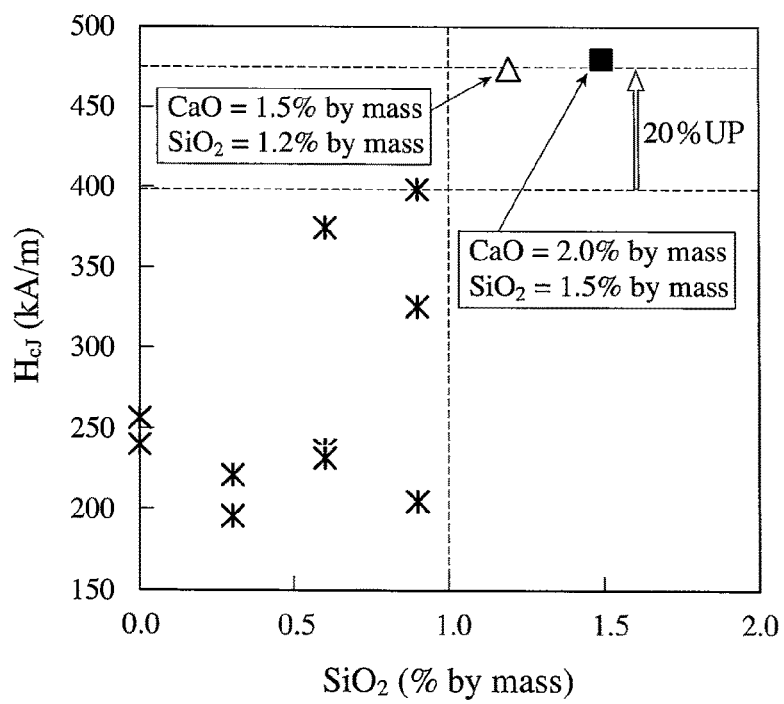
FIG. 4 is a graph showing the relation between the amount of $SiO_2$ added and coercivity $H_{cJ}$ in the sintered ferrite magnet of Example 1.

FIG. 4 compares Samples 113 and 119, and samples containing 1% or less by mass of $SiO_2$, which are shown in FIG. 2. It is clear that as compared with samples to which 1% or less by mass of $SiO_2$ was added, which have conventionally been considered optimum, Sample 113 to which 1.2% by mass of $SiO_2$ and 1.5% by mass of CaO were added, and Sample 119 to which 1.5% by mass of $SiO_2$ and 2.0% by mass of CaO were added had $H_{cJ}$ improved by about 20% or more.

As described above, because Ca—La—Co ferrite in which the atomic ratio of Co was 0.3 had an anisotropic magnetic field $H_A$ of 2.1 MA/m, the $H_{cJ}$ (400 kA/m or less) of the samples containing 1% or less by mass of $SiO_2$ was about 19% or less of the above anisotropic magnetic field $H_A$, but the $H_{cJ}$ of Samples 113 and 119 was about 23% of the above anisotropic magnetic field $H_A$, closer to the inherent potential of the material. Further, taking into consideration Samples 113 and 119 having CaO/$SiO_2$ of 1.25 and 1.33, and Sample 109 having better magnetic properties, it has been found that excellent magnetic properties can be obtained at a ratio of CaO/$SiO_2$ in a range of about 1.1-1.4.

Figure 5:
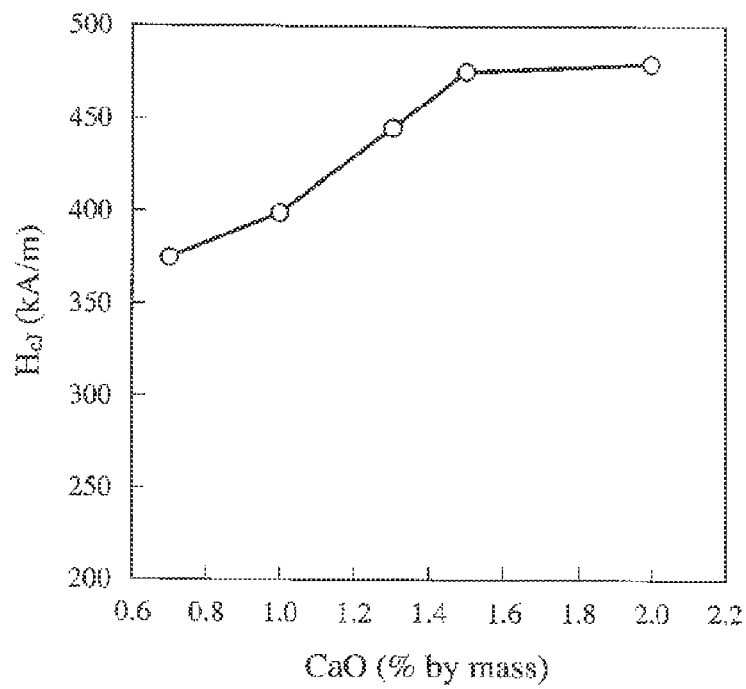
FIG. 5 is a graph showing the relation between the amount of CaO added and coercivity $H_{cJ}$ in the sintered ferrite magnet of Example 1.

FIG. 5 compares Sample 103 (CaO=0.7% by mass, and $SiO_2$=0.6% by mass), Sample 107 (CaO=1.0% by mass, and $SiO_2$=0.9% by mass), Sample 109 (CaO=1.3% by mass, and $SiO_2$=1.1% by mass), Sample 113 (CaO=1.5% by mass, and $SiO_2$=1.2% by mass), and Sample 119 (CaO=2.0% by mass, and $SiO_2$=1.5% by mass), which exhibit the highest $H_{cJ}$ at the CaO content of 0.7% by mass, 1.0% by mass, 1.3% by mass, 1.5% by mass, and 2.0% by mass, respectively, in FIG. 2. In FIG. 5, the axis of abscissas represents the amount (% by mass) of CaO added, and the axis of ordinates represents coercivity $H_{cJ}$. As is clear from FIG. 5, as the amount of CaO added increases, the coercivity $H_{cJ}$ is improved. Particularly when the amount of CaO added was 1.5% by mass and 2% by mass, the highest coercivity $H_{cJ}$ was obtained. Also, when the amount of CaO added was in a range of 1.2-2% by mass, the coercivity $H_{cJ}$ was about 20% or more of the anisotropic magnetic field $H_A$ of Ca—La—Co ferrite in which the atomic ratio of Co was 0.3, and when the amount of CaO added was in a range of 1.5-2% by mass, the coercivity $H_{cJ}$ was about 23% of the above anisotropic magnetic field $H_A$.

With respect to the sintered magnets of Samples 113 and 114, the amounts of $SiO_2$ and CaO added and those measured by inductively coupled plasma (ICP) atomic emission spectroscopy are shown in Table 2. The amounts of $SiO_2$ and CaO added are expressed by "% by mass" determined based on the entire composition.

TABLE 2

| Sample No. | Amount of $SiO_2$ (% by mass) | | Amount of CaO (% by mass) | |
|---|---|---|---|---|
| | Measured | Added | Measured | Added |
| 113 | 1.19 | 1.17 | 3.98 | 4.37 |
| 114 | 1.66 | 1.46 | 3.96 | 4.36 |

As shown in Table 2, $SiO_2$ added to the calcined body remained in the sintered magnet. The amount of $SiO_2$ measured was larger than that added, presumably because the amounts of other elements than $SiO_2$ became smaller than when added.

EXAMPLE 2

Sintered magnets were produced in the same manner as in Example 1, except that $SiO_2$ powder and $CaCO_3$ powder (calculated as CaO) were added in the amounts shown in Table 3 to a composition having the formula of $Ca_{1-x-y}La_xA_yFe_{2n-z}Co_zO_{19-\delta}$, wherein x=0.5, y=0, z=0.2, n=4.8, and $\delta \geq 0$.

Figure 6:
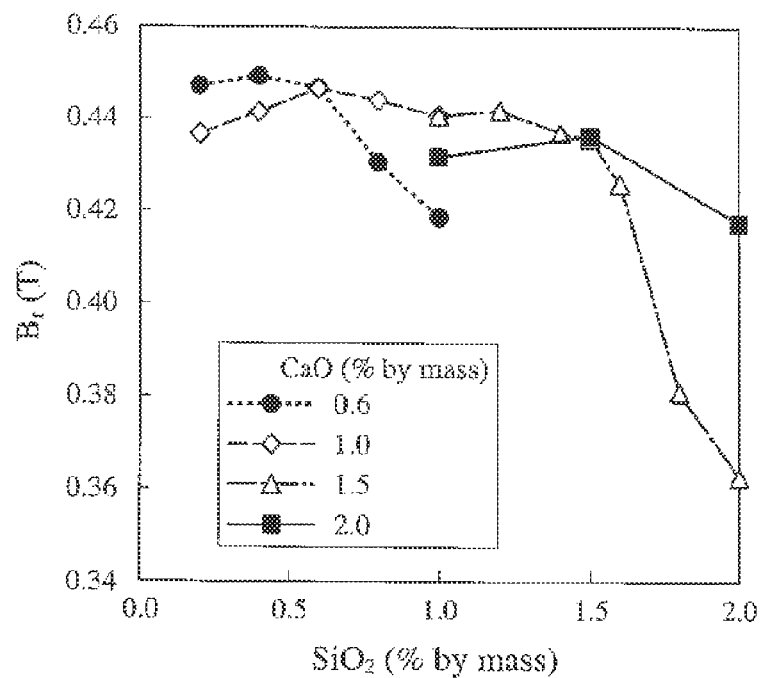
FIG. 6 is a graph showing the relation between the amount of $SiO_2$ added and a residual magnetic flux density $B_r$ in the sintered ferrite magnet of Example 2.
Figure 7:
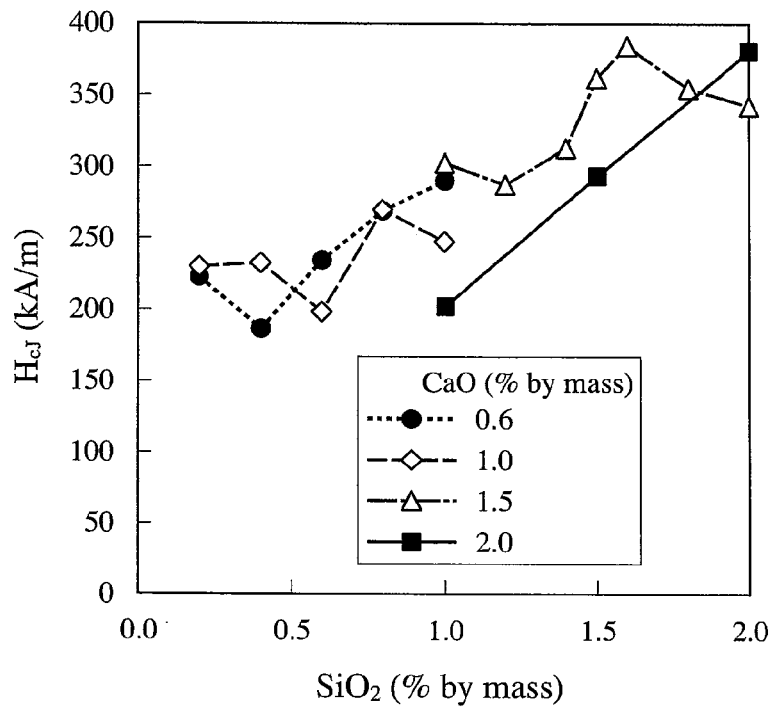
FIG. 7 is a graph showing the relation between the amount of $SiO_2$ added and coercivity $H_{cJ}$ in the sintered ferrite magnet of Example 2.
Figure 8:
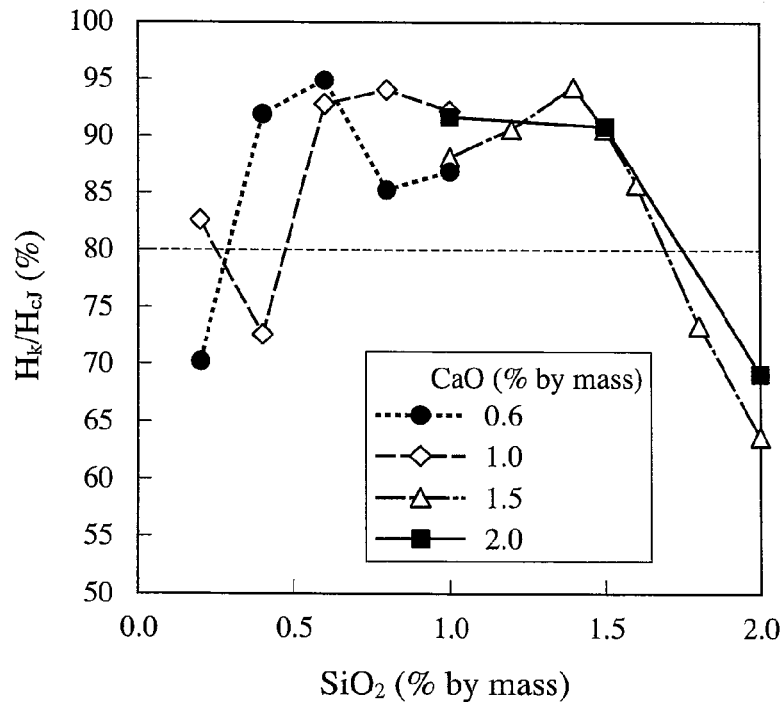
FIG. 8 is a graph showing the relation between the amount of $SiO_2$ added and a squareness ratio $H_k/H_{cJ}$ in the sintered ferrite magnet of Example 2.

The sintered magnets were measured with respect to a residual magnetic flux density $B_r$, coercivity $H_{cJ}$, and a squareness ratio $H_k/H_{cJ}$. The measurement results are shown in FIGS. 6-8. As in Example 1, in FIGS. 6-8, the axes of abscissas represent the amount (% by mass) of $SiO_2$ added, and the axes of ordinates represent a residual magnetic flux density $B_r$ (T) (FIG. 6), coercivity $H_{cJ}$ (FIG. 7), and a squareness ratio $H_k/H_{cJ}$ (FIG. 8), data at the same CaO content being connected by a straight line.

TABLE 3

| Sample No. | CaO (% by mass) | $SiO_2$ (% by mass) | CaO/$SiO_2$ |
|---|---|---|---|
| 201 | 0.6 | 0.2 | 3.00 |
| 202 | 0.6 | 0.4 | 1.50 |
| 203 | 0.6 | 0.6 | 1.00 |
| 204 | 0.6 | 0.8 | 0.75 |
| 205 | 0.6 | 1.0 | 0.60 |
| 206 | 1.0 | 0.2 | 5.00 |
| 207 | 1.0 | 0.4 | 2.50 |
| 208 | 1.0 | 0.6 | 1.67 |
| 209 | 1.0 | 0.8 | 1.25 |
| 210 | 1.0 | 1.0 | 1.00 |
| 211 | 1.5 | 1.0 | 1.50 |
| 212* | 1.5 | 1.2 | 1.25 |
| 213* | 1.5 | 1.4 | 1.07 |
| 214* | 1.5 | 1.5 | 1.00 |
| 215* | 1.5 | 1.6 | 0.94 |
| 216* | 1.5 | 1.8 | 0.83 |
| 217 | 1.5 | 2.0 | 0.75 |
| 218 | 2.0 | 1.0 | 2.00 |
| 219* | 2.0 | 1.5 | 1.33 |
| 220 | 2.0 | 2.0 | 1.00 |

Note:
*Within the present invention.

As is clear from FIGS. 6-8, even in the compositions in which the amount of Co was changed, as in Example 1, high magnetic properties were obtained when more than 1% by mass of $SiO_2$ and 1% or more by mass of CaO were added, and better magnetic properties were obtained when 1.4-1.6% by mass of $SiO_2$ and 1.5-2% by mass of CaO were added. Particularly, Sample 215 to which 1.6% by mass of $SiO_2$ and 1.5% by mass of CaO were added had specifically improved $H_{cJ}$, while suppressing decrease in $B_r$ and $H_k/H_{cJ}$ as much as possible.

Figure 9:
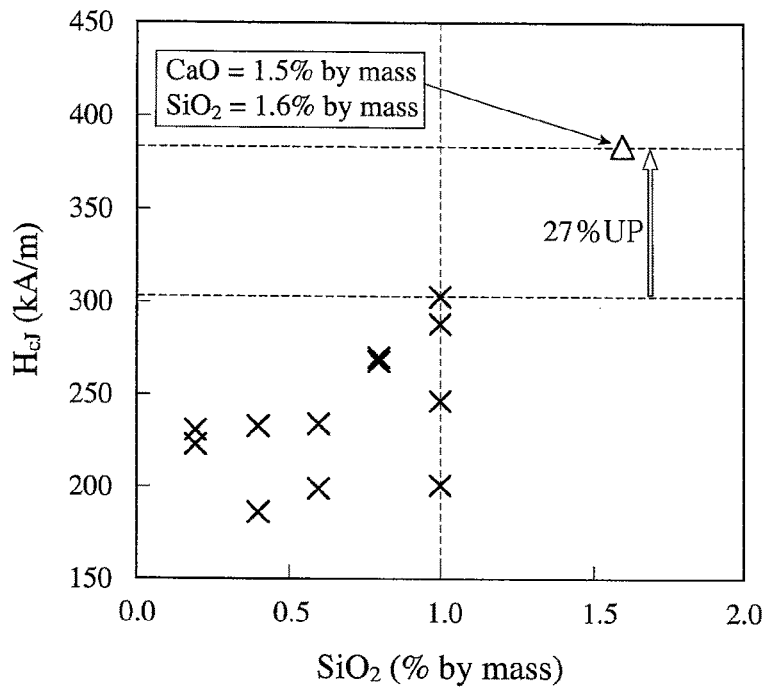
FIG. 9 is a graph showing the relation between the amount of $SiO_2$ added and coercivity $H_{cJ}$ in the sintered ferrite magnet of Example 2.

FIG. 9 compares Sample 215 to which 1.6% by mass of $SiO_2$ and 1.5% by mass of CaO were added, and samples to which 1% or less by mass of $SiO_2$ was added, which are shown in FIG. 7. As is clear from FIG. 9, Sample 215 to which 1.6% by mass of $SiO_2$ and 1.5% by mass of CaO were added had $H_{cJ}$ improved by about 27%, as compared with samples containing 1% or less by mass of $SiO_2$, which have conventionally been considered optimum.

SPD measurement revealed that Ca—La—Co ferrite in which the atomic ratio of Co was 0.2 had an anisotropic magnetic field $H_A$ of 1.9 MA/m (about 23.9 kOe). Accordingly, samples to which 1% or less by mass of $SiO_2$ was added had $H_{cJ}$ (300 kA/m or less), which was about 16% or less of the above anisotropic magnetic field $H_A$, Sample 215 to which 1.6% by mass of $SiO_2$ and 1.5% by mass of CaO were added had $H_{cJ}$, which was about 20% of the above anisotropic magnetic field $H_A$, close to the inherent potential of the material. Further, $CaO/SiO_2$ was 0.94 in Sample 215. It was found that excellent magnetic properties were obtained at a $CaO/SiO_2$ ratio in a range of about 0.9-1.1.

EXAMPLE 3

Sintered magnets were produced in the same manner as in Example 1, except that $SiO_2$ powder and $CaCO_3$ powder (calculated as CaO) were added in the amounts shown in Table 4 to a composition having the formula of $Ca_{1-x-y}La_xA_yFe_{2n-z}Co_zO_{19-\delta}$, wherein x=0.5, y=0, z=0.25, n=5.0, and $\delta \geq 0$.

Figure 10:
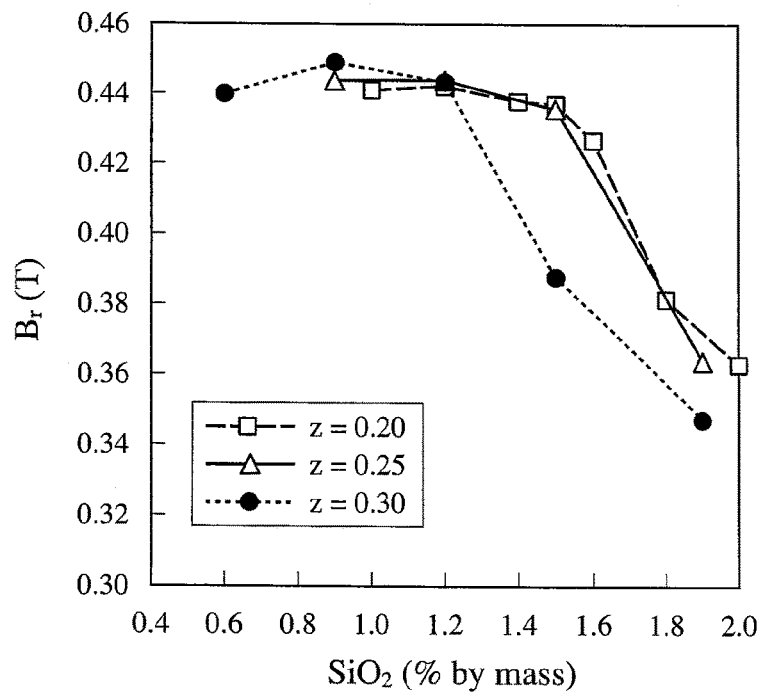
FIG. 10 is a graph showing the relation between the amount of $SiO_2$ added and a residual magnetic flux density $B_r$ in the sintered ferrite magnets of Examples 1-3.
Figure 11:
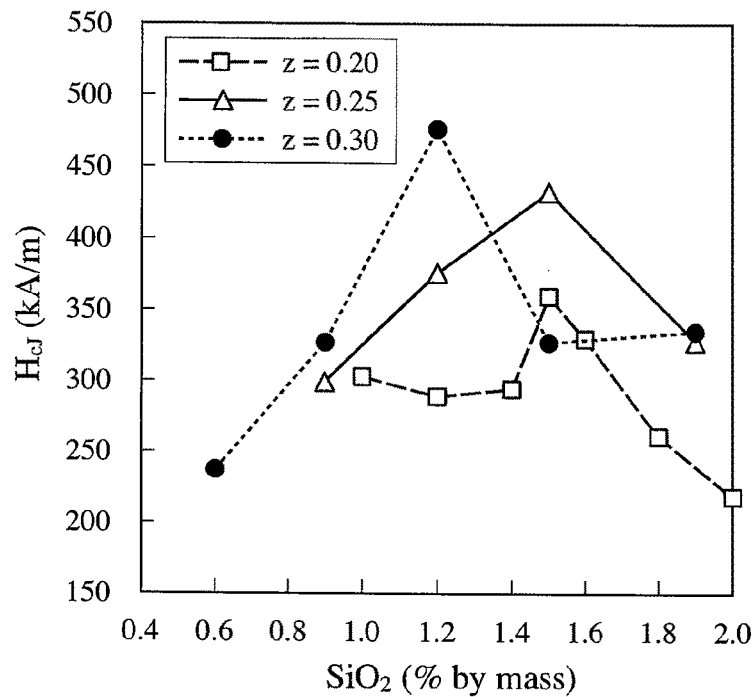
FIG. 11 is a graph showing the relation between the amount of $SiO_2$ added and coercivity $H_{cJ}$ in the sintered ferrite magnets of Examples 1-3.
Figure 12:
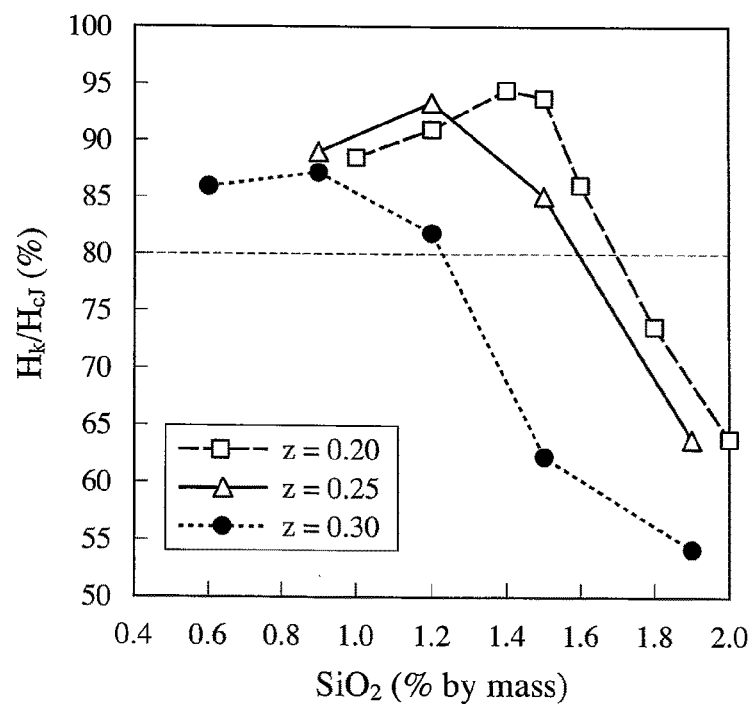
FIG. 12 is a graph showing the relation between the amount of $SiO_2$ and a squareness ratio $H_k/H_{cJ}$ in the sintered ferrite magnets of Examples 1-3.

The sintered magnets were measured with respect to a residual magnetic flux density $B_r$, coercivity $H_{cJ}$, and a squareness ratio $H_k/H_{cJ}$. The measurement results are shown in FIGS. 10-12. As in Example 1, in FIGS. 10-12, the axes of abscissas represent the amount (% by mass) of $SiO_2$ added, and the axes of ordinates represent a residual magnetic flux density $B_r$ (T) (FIG. 10), coercivity $H_{cJ}$ (FIG. 11), and a squareness ratio $H_k/H_{cJ}$ (FIG. 12). To investigate influence by the Co content (z) in FIGS. 10-12, Samples 111-115 in Example 1 and Samples 211-217 in Example 2 were plotted, and data at the same Co content (z) were connected by a straight line.

TABLE 4

| Sample No. | CaO (% by mass) | $SiO_2$ (% by mass) | $CaO/SiO_2$ |
|---|---|---|---|
| 301 | 1.5 | 0.9 | 2.00 |
| 302* | 1.5 | 1.2 | 1.33 |
| 303* | 1.5 | 1.5 | 1.00 |
| 304 | 1.5 | 1.9 | 0.78 |

Note:
*Within the present invention.

As is clear from FIGS. 10-12, even at the Co content (z) of 0.25, as in Examples 1 and 2, high magnetic properties were obtained when more than 1% by mass of $SiO_2$ and 1% or more by mass of CaO were added. Particularly when $SiO_2$ was 1.5% by mass, $H_{cJ}$ was specifically improved while suppressing decrease in $B_r$ and $H_k/H_{cJ}$ as much as possible.

It is also clear from FIGS. 10-12 that the preferred amount of $SiO_2$ differs at z of 0.3, 0.25 and 0.2, and that as the Co content (z) decreases, the preferred amount of $SiO_2$ tends to shift toward a higher side. Namely, the amount of $SiO_2$ providing high $H_{cJ}$ while maintaining high $B_r$ and $H_k/H_{cJ}$ was in a range of 1.1-1.2% by mass when the Co content (z) was 0.3, and in a range of 1.4-1.6% by mass when the Co content (z) was 0.25 and 0.2, respectively.

Figure 13:
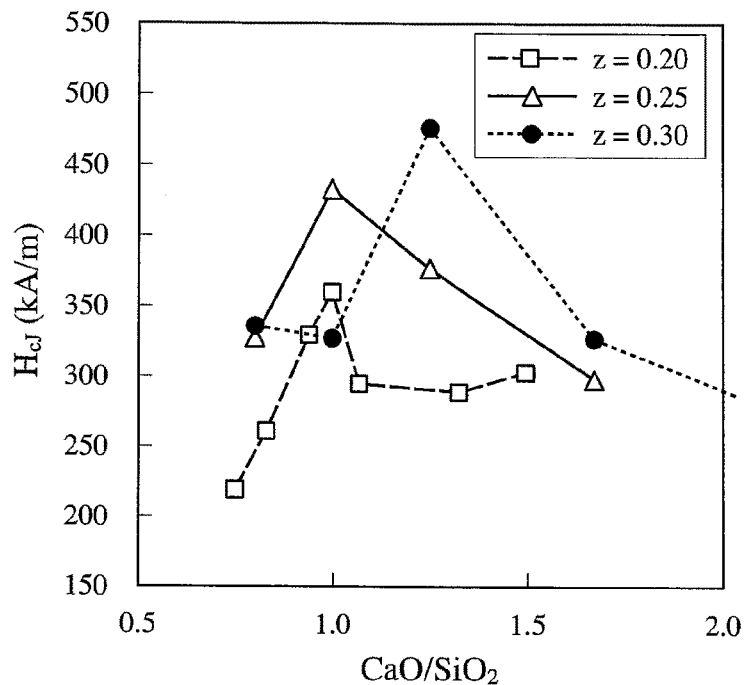
FIG. 13 is a graph showing the relation between CaO/$SiO_2$ and coercivity $H_{cJ}$ in the sintered ferrite magnets of Examples 1-3.

FIG. 13 shows these data, the axis of abscissas representing $CaO/SiO_2$, and the axis of ordinates representing coercivity $H_{cJ}$, and data at the same Co content (z) being connected by a straight line. As is clear from FIG. 13, when both $SiO_2$ and CaO are added, magnetic properties can be improved by setting $CaO/SiO_2$ in a range of 0.8-2.0. In this case, it is clear that the preferred range of $CaO/SiO_2$ slightly differs between when z=0.3 and when z<0.3 (z=0.25, z=0.2). Namely, the range of $CaO/SiO_2$ for achieving high $H_{cJ}$ while maintaining high $B_r$ and $H_k/H_{cJ}$ is preferably 1-1.7, more preferably 1.2-1.4, when z=0.3, and preferably 0.8-1.4, more preferably 0.9-1.1, when z<0.3 (z=0.25, z=0.2). Considering both cases of z≥0.3 and z<0.3, it is preferably 0.8-1.7, more preferably 0.9-1.4.

It is clear from FIG. 11 that a lower Co content (z) tends to provide a lower maximum value of $H_{cJ}$. However, as considered in Examples 1 and 2, $H_{cJ}$ was improved by 20% or more in the same Co content (z), as compared with samples to which 1% or less by mass of $SiO_2$ (conventionally considered optimum) was added, the improvement of $H_{cJ}$ being 4% or more of the anisotropic magnetic field $H_A$. It was thus confirmed that the sintered magnets had $H_{cJ}$ close to potential inherent in the materials. Accordingly, when magnets having the $H_{cJ}$ same as that of conventional sintered Ca—La—Co ferrite magnets are provided, the amounts of rare and expensive Co and La can be reduced. As in Example 2, even for compositions having a Co content z of 0.2, which are not expected to have high $H_{cJ}$ so that it has been difficult to put them into practical use, $H_{cJ}$ on a practical level can be obtained, thereby providing high-performance sintered ferrite magnets with reduced amounts of Co and La at a low cost.

EXAMPLE 4

Sintered magnets were produced in the same manner as in Example 1, except that $CaCO_3$ powder, $La(OH)_3$ powder, $SrCO_3$ powder, $BaCO_3$ powder, $Fe_2O_3$ powder and $Co_3O_4$ powder were mixed to provide the formula of $Ca_{1-x-y1-y2}La_xSr_{y1}Ba_{y2}Fe_{2n-z}Co_zO_{19-\delta}$ wherein x=0.5, y1+y2=0.05, z=0.3, n=5.3, and $\delta \geq 0$, and that the amounts of $SiO_2$ powder and $CaCO_3$ powder (calculated as CaO) relative to the total amount of these mixed powders were changed as shown in Table 5. The atomic ratios of Sr (y1) and Ba (y2) are also shown in Table 5. Samples 111-115 are sintered magnets evaluated in Example 1.

Figure 14:
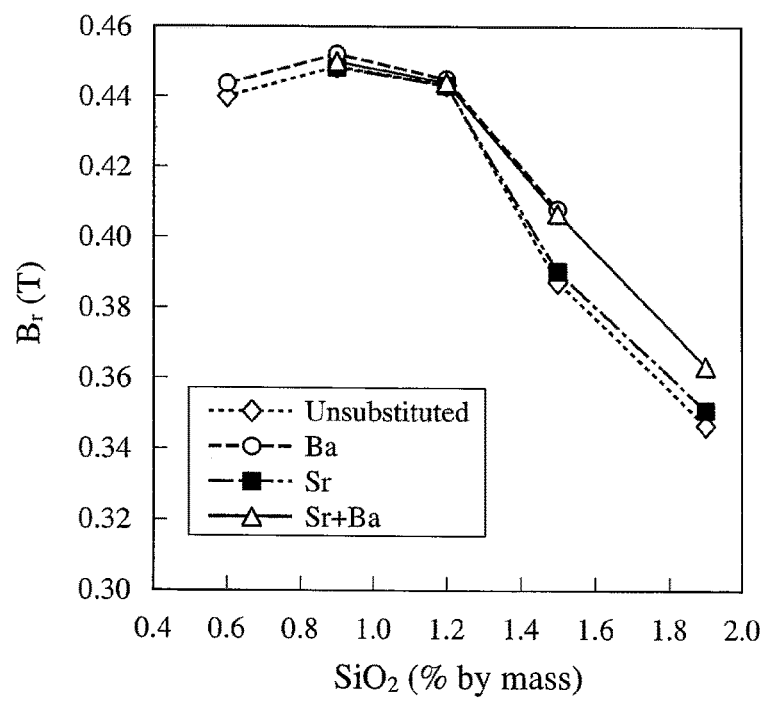
FIG. 14 is a graph showing the relation between the amount of $SiO_2$ added and a residual magnetic flux density $B_r$ in the sintered ferrite magnet of Example 4.
Figure 15:
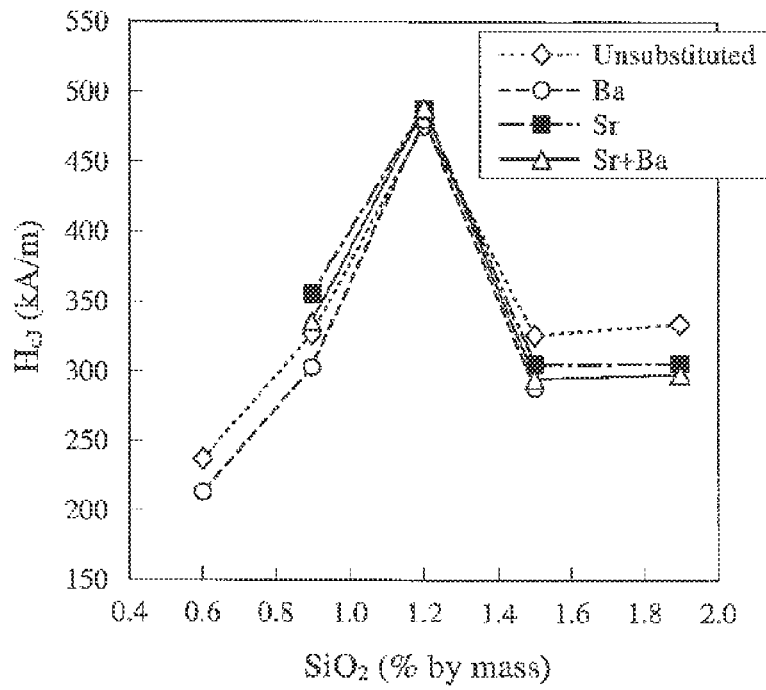
FIG. 15 is a graph showing the relation between the amount of $SiO_2$ added and coercivity $H_{cJ}$ in the sintered ferrite magnet of Example 4.
Figure 16:
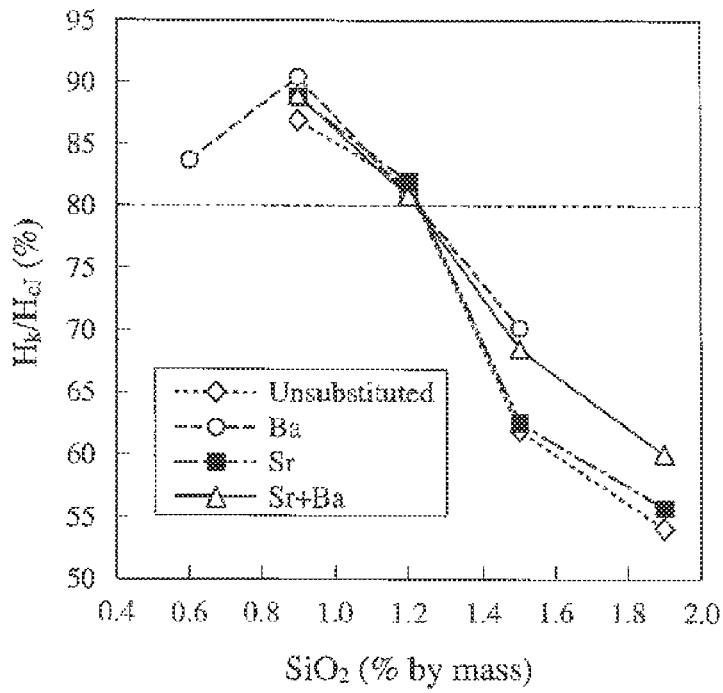
FIG. 16 is a graph showing the relation between the amount of $SiO_2$ added and a squareness ratio $H_k/H_{cJ}$ in the sintered ferrite magnet of Example 4.

The sintered magnets were measured with respect to a residual magnetic flux density $B_r$, coercivity $H_{cJ}$ and a squareness ratio $H_k/H_{cJ}$, wherein $H_k$ is the value of H, at which J is $0.95B_r$, on a curve of J (intensity of magnetization) to H (intensity of a magnetic field) in the second quadrant. The measurement results are shown in FIGS. 14-16. In FIGS. 14-16, the axes of abscissas represent the amount (% by mass) of $SiO_2$ added, and the axes of ordinates represent a residual magnetic flux density $B_r$ (T) (FIG. 14), coercivity $H_{cJ}$ (FIG. 15) and a squareness ratio $H_k/H_{cJ}$ (FIG. 16), respectively. In the figures, data connected by a straight line are denoted by "Unsubstituted" representing Samples 111-115, "Ba" representing Samples 401-404 to which only Ba was added, "Sr" representing Samples 405-408 to which only Sr was added, and "Sr+Ba" representing Samples 409-412 to which both Sr and Ba were added.

TABLE 5

| Sample No. | Atomic Ratio of Sr (y1) | Atomic Ratio of Ba (y2) | CaO (% by mass) | SiO$_2$ (% by mass) | CaO/SiO$_2$ |
|---|---|---|---|---|---|
| 401 | 0 | 0.05 | 1.5 | 0.6 | 2.50 |
| 402 | 0 | 0.05 | 1.5 | 0.9 | 1.67 |
| 403* | 0 | 0.05 | 1.5 | 1.2 | 1.25 |
| 404* | 0 | 0.05 | 1.5 | 1.5 | 1.00 |
| 405 | 0.05 | 0 | 1.5 | 0.9 | 1.67 |
| 406* | 0.05 | 0 | 1.5 | 1.2 | 1.25 |
| 407* | 0.05 | 0 | 1.5 | 1.5 | 1.00 |
| 408 | 0.05 | 0 | 1.5 | 1.9 | 0.80 |
| 409 | 0.025 | 0.025 | 1.5 | 0.9 | 1.67 |
| 410* | 0.025 | 0.025 | 1.5 | 1.2 | 1.25 |
| 411* | 0.025 | 0.025 | 1.5 | 1.5 | 1.00 |
| 412 | 0.025 | 0.025 | 1.5 | 1.9 | 0.80 |
| 111 | 0 | 0 | 1.5 | 0.6 | 2.50 |
| 112 | 0 | 0 | 1.5 | 0.9 | 1.67 |
| 113* | 0 | 0 | 1.5 | 1.2 | 1.25 |
| 114* | 0 | 0 | 1.5 | 1.5 | 1.00 |
| 115 | 0 | 0 | 1.5 | 1.9 | 0.80 |

Note:
*Within the present invention.

As is clear from FIGS. 14-16, the compositions to which Sr and/or Ba were added also had high magnetic properties when more than 1% by mass of SiO$_2$ and 1% or more by mass of CaO were added, as in Examples 1-3 not containing Sr and Ba.

Figure 17:
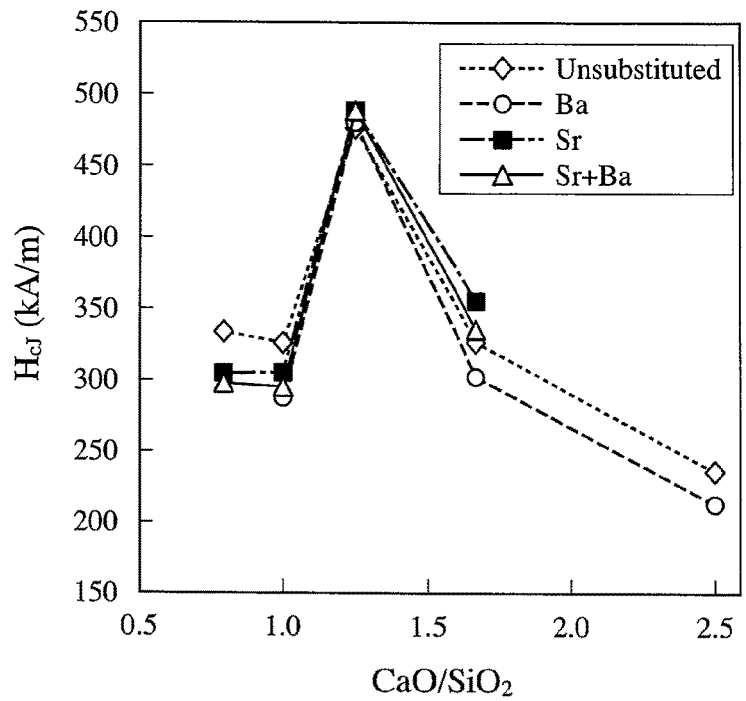
FIG. 17 is a graph showing the relation between CaO/$SiO_2$ and coercivity $H_{cJ}$ in the sintered ferrite magnet of Example 4.

FIG. 17 is a graph showing these data plotted with the axis of abscissas being CaO/SiO$_2$, and the axis of ordinates being coercivity H$_{cJ}$. As is clear from FIG. 17, the compositions to which Sr and/or Ba were added also had high magnetic properties at a CaO/SiO$_2$ ratio of 0.8-2.0 when both SiO$_2$ and CaO were added, as in Examples 1-3 not containing Sr and Ba.

EXAMPLE 5

Sintered magnets were produced in the same manner as in Example 1, except that SrCO$_3$ powder, La(OH)$_3$ powder, Fe$_2$O$_3$ powder and Co$_3$O$_4$ powder were mixed to have the formula of Sr$_{1-x}$La$_x$Fe$_{2n-z}$Co$_z$O$_{19-\delta}$, wherein x=0.2, z=0.2, n=5.8, and δ≥0, and that the amounts of SiO$_2$ powder and CaCO$_3$ powder (calculated as CaO) were changed as shown in Table 6. These sintered magnets are so-called Sr—La—Co ferrite magnets having basic compositions outside the present invention.

The sintered magnets were measured with respect to a residual magnetic flux density B$_r$, coercivity H$_{cJ}$, and a squareness ratio H$_k$/H$_{cJ}$. The measurement results are shown in FIGS. 18-20.

TABLE 6

| Sample No. | CaO (% by mass) | SiO$_2$ (% by mass) | CaO/SiO$_2$ |
|---|---|---|---|
| 501 | 0.7 | 0.0 | — |
| 502 | 0.7 | 0.3 | 2.33 |
| 503 | 0.7 | 0.6 | 1.17 |
| 504 | 1.0 | 0.0 | — |
| 505 | 1.0 | 0.3 | 3.33 |
| 506 | 1.0 | 0.6 | 1.67 |
| 507 | 1.0 | 0.9 | 1.11 |
| 508 | 1.0 | 1.2 | 0.83 |
| 509 | 1.5 | 0.3 | 5.00 |
| 510 | 1.5 | 0.6 | 2.50 |
| 511 | 1.5 | 0.9 | 1.67 |
| 512 | 1.5 | 1.2 | 1.25 |
| 513 | 1.5 | 1.5 | 1.00 |

Figure 18:
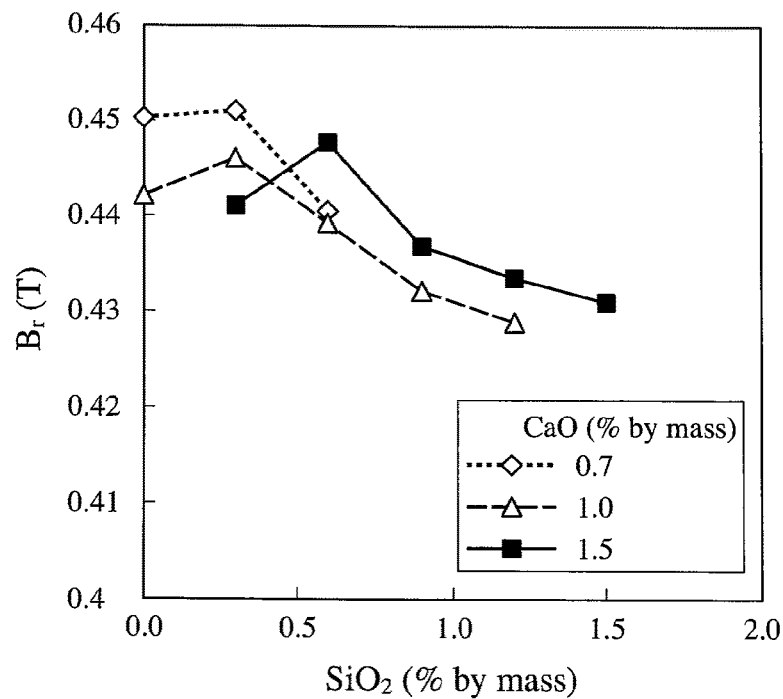
FIG. 18 is a graph showing the relation between the amount of $SiO_2$ added and a residual magnetic flux density $B_r$ in the sintered ferrite magnet of Example 5.
Figure 19:
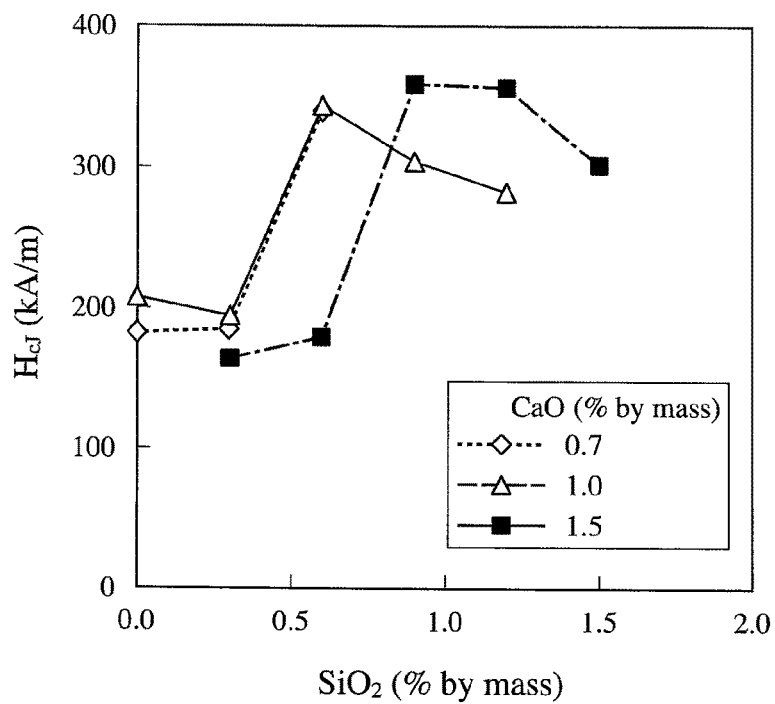
FIG. 19 is a graph showing the relation between the amount of $SiO_2$ added and coercivity $H_{cJ}$ in the sintered ferrite magnet of Example 5.
Figure 20:
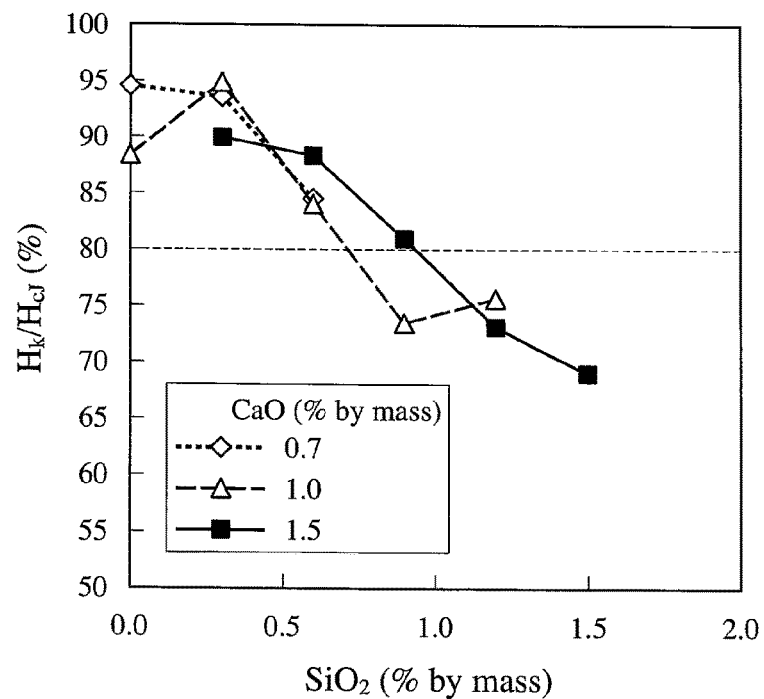
FIG. 20 is a graph showing the relation between the amount of $SiO_2$ added and a squareness ratio $H_k/H_{cJ}$ in the sintered ferrite magnet of Example 5.

It is clear from FIGS. 18-20 that when more than 1% by mass of SiO$_2$ was added, Sr—La—Co ferrite magnets do not have good magnetic properties, with H$_{cJ}$ not extremely improved, and the squareness ratio lowered to less than 80%.

EXAMPLE 6

CaCO$_3$ powder, La(OH)$_3$ powder, Fe$_2$O$_3$ powder and Co$_3$O$_4$ powder were mixed to have the formula of Ca$_{1-x-y}$La$_x$A$_y$Fe$_{2n-z}$Co$_z$O$_{19-\delta}$, wherein x=0.5, y=0, z=0.3, n=5.2, and δ≥0, and 0.1% by mass of H$_3$BO$_3$ powder was added to 100% by mass of the mixed powders to obtain a starting material powder. This starting material powder was mixed for 4 hours by a wet ball mill, and granulated by drying. It was calcined at 1300° C. for 3 hours in the air, and the calcined body was pulverized to coarse powder by a hammer mill.

1.2% by mass of SiO$_2$ powder and 1.5% by mass (calculated as CaO) of CaCO$_3$ powder were added to the coarse powder, and the first fine pulverization was conducted to an average particle size of 0.5 μm (measured by an air permeation method) by a wet ball mill with water as a solvent. The resultant powder was dried, and heat-treated at 1000° C. for 5 hours in the air. The heat-treated powder had an average particle size of 1.4 μm (measured by an air permeation method). The heat-treated powder was subject to the second fine pulverization to an average particle size of 0.8 μm by a wet ball mill. While removing the solvent, a fine powder slurry obtained by the above heat-treating, repulverizing step was molded in a magnetic field of about 1.3 T under pressure of about 50 MPa, with a compression direction parallel to the direction of a magnetic field. The resultant green body was sintered at 1200° C. for 1 hour in the air to obtain a sintered magnet.

In addition, a sintered magnet was produced in the same manner as above, except for conducting only the first fine pulverization to an average particle size of 0.8 μm (measured by an air permeation method) without the heat treatment and the second fine pulverization.

The sintered magnets were measured with respect to a residual magnetic flux density B$_r$, coercivity H$_{cJ}$, and a squareness ratio H$_k$/H$_{cJ}$, wherein H$_k$ was the value of H at J of 0.95B$_r$ on a curve of J (intensity of magnetization) to H (intensity of a magnetic field) in the second quadrant. The measurement results are shown in Table 7. Table 7 shows Sample 601 pulverized in the heat-treating, repulverizing step, and Sample 602 pulverized only in the first fine pulverization.

TABLE 7

| Sample No. | Br (T) | H$_{cJ}$ (kA/m) | Hk/H$_{cJ}$ (%) |
|---|---|---|---|
| 601 | 0.438 | 494.0 | 80.1 |
| 602 | 0.436 | 387.9 | 80.4 |

As is clear from Table 7, the use of the heat-treating, repulverizing step drastically improved H$_{cJ}$ with B$_r$ and H$_k$/H$_{cJ}$ unchanged, than the use of only one usual pulverization.

Sample 113 in Example 1 shown in Table 1 was obtained in the same manner as in this Example except for using only one usual pulverization to an average particle size of 0.55 μm, having magnetic properties of H$_{cJ}$=476 kA/m, Br=0.443 T, and H$_k$/H$_{cJ}$=81.6% as shown in FIGS. 1-3. Comparison of this sample with Sample 601 in this Example revealed that Sample in this Example had slightly improved $H_{cJ}$ with $B_r$ and $H_k/H_{cJ}$ substantially unchanged than the sample (average particle size 0.55 μm) in Example 1, despite the fact that the pulverized powder had a large average particle size (0.8 μm). Namely, even though powder after the second fine pulverization step has relatively large particle sizes, the use of the heat-treating, repulverizing step provides as small $H_{cJ}$ as when using powder having relatively small particle sizes, which is obtained by a usual pulverization step. Accordingly, the second fine pulverization step can be conducted in a shortened period of time, thereby improving dewatering and pressing cycles.

EFFECT OF THE INVENTION

Because the production method of the present invention can extremely improve $H_{cJ}$ while maintaining high $B_r$ and squareness ratio $H_k/H_{cJ}$, even if the amounts of rare and expensive Co and La indispensable for Ca—La—Co ferrite are reduced than before, economically advantageous Ca—La—Co ferrite magnets can be obtained. Ca—La—Co ferrite magnets obtained by the production method of the present invention do not suffer demagnetization by a demagnetizing field generated by thinning the magnet. Accordingly, the sintered ferrite magnet of the present invention can be used for electronic parts for automobiles and parts for electric appliances, such as small, light-weight, high-performance motors, power generators, speakers, etc.

What is claimed is:

1. A method for producing a sintered ferrite magnet comprising (a) a ferrite phase having a hexagonal M-type magnetoplumbite structure, and (b) a grain boundary phase indispensably containing Si, said method comprising
    a step of preparing calcined ferrite containing a ferrite phase having a hexagonal M-type magnetoplumbite structure, which comprises Ca, an element R which is at least one of rare earth elements and indispensably includes La, an element A which is Ba and/or Sr, Fe, and Co as indispensable elements, the composition of metal elements of Ca, R, A, Fe and Co being represented by the general formula of $Ca_{1-x-y}R_xA_yFe_{2n-z}Co_z$, wherein the atomic ratios of Ca (1-x-y), the element R (x), the element A (y) and Co (z), and the molar ratio of n meet the following relations:

$0.3 \leq (1-x-y) \leq 0.65$, $0.2 \leq x \leq 0.65$, $0 \leq y \leq 0.2$, $0.25 \leq z \leq 0.65$, and $4 \leq n \leq 7$;

a step of pulverizing said calcined body to powder;
    a step of molding said powder to a green body; and
    a step of sintering said green body to obtain a sintered body;
    more than 1% by mass and 1.6% or less by mass of $SiO_2$ and 1.2-2% by mass (calculated as CaO) of $CaCO_3$ being added to 100% by mass of said calcined body, before the pulverization step,
    a ratio of the amount (calculated as CaO) of $CaCO_3$ to the amount of $SiO_2$ being 0.9-1.1 when $0.25 \leq z \leq 0.3$ and 1.1-1.4 when $0.3 \leq z \leq 0.65$.

2. The method for producing a sintered ferrite magnet according to claim 1, wherein the amount of $SiO_2$ added is 1.1-1.6% by mass.

3. The method for producing a sintered ferrite magnet according to claim 1, wherein (1-x-y), x, y and z and n meet the relations of $0.35 \leq (1-x-y) \leq 0.55$, $0.4 \leq x \leq 0.6$, $0 \leq y \leq 0.15$, $0.25 \leq z \leq 0.4$, and $4.5 \leq n \leq 6$.

4. The method for producing a sintered ferrite magnet according to claim 1, wherein said pulverization step comprises a first fine pulverization step, a step of heat-treating powder obtained by said first fine pulverization step, and a second fine pulverization step of pulverizing the heat-treated powder again.

5. A sintered ferrite magnet comprising
    (a) a ferrite phase having a hexagonal M-type magnetoplumbite structure comprising Ca, an element R which is at least one of rare earth elements and indispensably includes La, an element A which is Ba and/or Sr, Fe, and Co as indispensable elements, the composition of metal elements of Ca, R, A, Fe and Co being represented by the general formula of $Ca_{1-x-y}R_xA_yFe_{2n-z}Co_z$, wherein the atomic ratios of Ca (1-x-y), the element R (x), the element A (y) and Co (z), and the molar ratio of n meet the following relations:

$0.3 \leq (1-x-y) \leq 0.65$, $0.2 \leq x \leq 0.65$, $0 \leq y \leq 0.2$, $0.25 \leq z \leq 0.65$, and $4 \leq n \leq 7$, and (b) a grain boundary phase indispensably containing Si, and Ca in amounts determined by more than 1% by mass and 1.6% or less by mass of $SiO_2$ powder and 1.2-2% by mass (calculated as CaO) of $CaCO_3$ powder added to 100% by mass of said ferrite phase,
    a ratio of the amount (calculated as CaO) of $CaCO_3$ to the amount of $SiO_2$ being 0.9-1.1 when $0.25 \leq z \leq 0.3$, and 1.1-1.4 when $0.3 \leq z \leq 0.65$.

6. The sintered ferrite magnet according to claim 5, wherein the amount of $SiO_2$ powder added is 1.1-1.6% by mass based on 100% by mass of said ferrite phase.

7. The sintered ferrite magnet according to claim 5, wherein (1-x-y), x, y and z and n meet the relations of $0.35 \leq (1-x-y) \leq 0.55$, $0.4 \leq x \leq 0.6$, $0 \leq y \leq 0.15$, $0.25 \leq z \leq 0.4$, and $4.5 \leq n \leq 6$.

* * * * *